(12) United States Patent
Verfuerth

(10) Patent No.: US 10,206,265 B2
(45) Date of Patent: *Feb. 12, 2019

(54) OUTDOOR LIGHTING FIXTURES CONTROL SYSTEMS AND METHODS

(71) Applicant: Orion Energy Systems, Inc., Manitowoc, WI (US)

(72) Inventor: Neal R. Verfuerth, Manitowoc, WI (US)

(73) Assignee: ORION ENERGY SYSTEMS, INC., Manitowoc, WI (US)

( * ) Notice: Subject to any disclaimer, the term of this patent is extended or adjusted under 35 U.S.C. 154(b) by 544 days.

This patent is subject to a terminal disclaimer.

(21) Appl. No.: 14/579,527

(22) Filed: Dec. 22, 2014

(65) Prior Publication Data
US 2015/0216019 A1     Jul. 30, 2015

Related U.S. Application Data

(60) Continuation of application No. 13/932,962, filed on Jul. 1, 2013, now Pat. No. 8,921,751, which is a
(Continued)

(51) Int. Cl.
| | | |
|---|---|---|
| *H05B 37/02* | (2006.01) | |
| *H05B 33/08* | (2006.01) | |
| *H05B 41/36* | (2006.01) | |

(52) U.S. Cl.
CPC ..... *H05B 37/0227* (2013.01); *H05B 33/0854* (2013.01); *H05B 37/0272* (2013.01);
(Continued)

(58) Field of Classification Search
CPC ............ H05B 37/0245; H05B 37/0272; H04N 5/2256; H04N 5/23203; Y02B 20/72; G06T 7/20
(Continued)

(56) References Cited

U.S. PATENT DOCUMENTS

| | | | |
|---|---|---|---|
| 1,254,520 | A | 1/1918 | MacDuff |
| 2,403,240 | A | 7/1946 | Sawin |

(Continued)

FOREIGN PATENT DOCUMENTS

| | | |
|---|---|---|
| GB | 2 237 826 | 5/1991 |
| GB | 2 250 172 | 6/1992 |

(Continued)

OTHER PUBLICATIONS

"About Sun Dome Tubular Skylights," having a date indication of © 2009, 8 pages.

(Continued)

*Primary Examiner* — Georgia Y Epps
*Assistant Examiner* — Don Williams
(74) *Attorney, Agent, or Firm* — Marshall, Gerstein & Borun LLP

(57) ABSTRACT

One embodiment of the invention relates to a system for operating a plurality of streetlights in response to motion from a vehicle. The system includes a sensor associated with at least one of the streetlights and configured to detect the presence of a moving vehicle and to provide a signal representative of the moving vehicle. The system further includes a radio frequency transceiver associated with each of the streetlights. The system yet further includes processing electronics configured to receive the signal representative of the moving vehicle from the sensor and to cause the radio frequency transceiver to transmit a command to one or more of the plurality of the streetlights to change lighting states along a pathway for the vehicle.

12 Claims, 7 Drawing Sheets

Related U.S. Application Data division of application No. 13/223,146, filed on Aug. 31, 2011, now Pat. No. 8,476,565, and a continuation-in-part of application No. 12/550,270, filed on Aug. 28, 2009, now Pat. No. 8,450,670, which is a continuation-in-part of application No. 11/771,317, filed on Jun. 29, 2007, now Pat. No. 7,638,743, and a continuation-in-part of application No. 12/240,805, filed on Sep. 29, 2008, now Pat. No. 8,344,665, which is a continuation-in-part of application No. 12/057,217, filed on Mar. 27, 2008, now Pat. No. 8,406,937, said application No. 13/223,146 is a continuation-in-part of application No. 12/875,930, filed on Sep. 3, 2010, now Pat. No. 8,866,582.

(60) Provisional application No. 61/380,165, filed on Sep. 3, 2010, provisional application No. 61/275,985, filed on Sep. 4, 2009.

(52) U.S. Cl.
CPC ......... *H05B 37/0281* (2013.01); *H05B 41/36* (2013.01); *Y02B 20/42* (2013.01); *Y02B 20/44* (2013.01); *Y02B 20/72* (2013.01)

(58) Field of Classification Search
USPC ................ 250/205, 221, 239; 340/555–557; 315/149–159, 291, 360
See application file for complete search history.

(56) References Cited

U.S. PATENT DOCUMENTS

| | | | |
|---|---|---|---|
| 2,485,148 | A | 10/1949 | Fralin |
| 2,636,977 | A | 4/1953 | Foster |
| 3,292,319 | A | 12/1966 | McCarthy |
| 3,337,035 | A | 8/1967 | Pennybacker |
| 3,416,266 | A | 12/1968 | Eron |
| 3,511,559 | A | 5/1970 | Foster |
| 3,757,290 | A | 9/1973 | Ross et al. |
| 4,013,922 | A | 3/1977 | Van Der Meulen |
| 4,023,043 | A | 5/1977 | Stevenson |
| 4,114,186 | A | 9/1978 | Dominguez |
| 4,135,181 | A | 1/1979 | Bogacki et al. |
| 4,144,462 | A | 3/1979 | Sieron et al. |
| 4,190,800 | A | 2/1980 | Kelly et al. |
| 4,204,194 | A | 5/1980 | Bogacki |
| 4,204,195 | A | 5/1980 | Bogacki |
| 4,306,769 | A | 12/1981 | Martinet |
| 4,360,881 | A | 11/1982 | Martinson |
| 4,387,417 | A | 6/1983 | Plemmons et al. |
| 4,489,386 | A | 12/1984 | Breddan |
| 4,727,593 | A | 2/1988 | Goldstein |
| 4,733,505 | A | 3/1988 | Van Dame |
| 4,809,468 | A | 3/1989 | Bareiss |
| 4,841,914 | A | 6/1989 | Chattan |
| 4,860,511 | A | 8/1989 | Weisner et al. |
| 4,883,340 | A | 11/1989 | Dominguez |
| 4,998,095 | A * | 3/1991 | Shields ................ G08B 25/016 340/538 |
| 5,099,622 | A | 3/1992 | Sutton |
| 5,165,465 | A | 11/1992 | Kenet |
| 5,253,444 | A | 10/1993 | Donoho et al. |
| 5,261,179 | A | 11/1993 | Schwinler |
| 5,353,543 | A | 10/1994 | Teraoka |
| 5,371,661 | A | 12/1994 | Simpson |
| 5,426,620 | A | 6/1995 | Budney |
| 5,489,827 | A * | 2/1996 | Xia ................... H05B 37/0227 315/154 |
| 5,546,712 | A | 8/1996 | Bixby |
| 5,572,438 | A | 11/1996 | Ehlers et al. |
| 5,598,042 | A | 1/1997 | Mix et al. |
| 5,644,173 | A | 7/1997 | Eliason et al. |
| 5,649,394 | A | 7/1997 | Ohba |
| 5,655,339 | A | 8/1997 | DeBlock et al. |
| 5,713,160 | A | 2/1998 | Heron |
| 5,717,609 | A | 2/1998 | Packa et al. |
| 5,729,387 | A | 3/1998 | Takahashi et al. |
| 5,758,331 | A | 5/1998 | Johnson |
| 5,836,114 | A | 11/1998 | Ohba |
| 5,918,404 | A | 7/1999 | Ohba |
| 5,956,462 | A | 9/1999 | Langford |
| 5,962,989 | A | 10/1999 | Baker |
| 6,003,471 | A | 12/1999 | Ohba |
| 6,122,603 | A | 9/2000 | Budike, Jr. |
| 6,169,979 | B1 | 1/2001 | Johnson |
| 6,257,735 | B1 | 7/2001 | Baar |
| D447,266 | S | 8/2001 | Verfuerth |
| 6,363,667 | B2 | 4/2002 | O'Neill |
| 6,367,419 | B1 | 4/2002 | Gosselin |
| 6,418,674 | B1 | 7/2002 | Deraedt |
| D463,059 | S | 9/2002 | Verfuerth |
| 6,467,933 | B2 | 10/2002 | Baar |
| 6,524,175 | B2 | 2/2003 | Beaudry et al. |
| 6,528,782 | B1 | 3/2003 | Zhang et al. |
| 6,528,957 | B1 | 3/2003 | Luchaco |
| 6,535,859 | B1 | 3/2003 | Yablonowski et al. |
| 6,585,396 | B1 | 7/2003 | Verfuerth |
| D479,826 | S | 9/2003 | Verfuerth et al. |
| 6,622,097 | B2 | 9/2003 | Hunter |
| 6,633,823 | B2 | 10/2003 | Bartone et al. |
| 6,644,836 | B1 | 11/2003 | Adams |
| D483,332 | S | 12/2003 | Verfuerth |
| 6,671,586 | B2 | 12/2003 | Davis et al. |
| 6,717,660 | B1 | 4/2004 | Bernardo |
| 6,731,080 | B2 | 5/2004 | Flory |
| D494,700 | S | 8/2004 | Hartman et al. |
| 6,774,790 | B1 | 8/2004 | Houston |
| 6,785,592 | B1 | 8/2004 | Smith et al. |
| 6,813,864 | B2 | 11/2004 | Landis |
| 6,828,695 | B1 | 12/2004 | Hansen |
| 6,832,135 | B2 | 12/2004 | Ying |
| 6,894,609 | B2 | 5/2005 | Menard et al. |
| 6,938,210 | B1 | 8/2005 | Huh |
| 6,979,097 | B2 | 12/2005 | Elam et al. |
| 6,983,210 | B2 | 1/2006 | Matsubayashi et al. |
| 6,990,394 | B2 | 1/2006 | Pasternak |
| 7,027,736 | B1 | 4/2006 | Mier-Langner et al. |
| 7,130,719 | B2 | 10/2006 | Ehlers et al. |
| 7,130,832 | B2 | 10/2006 | Bannai et al. |
| 7,167,777 | B2 | 1/2007 | Budike, Jr. |
| 7,259,527 | B2 | 8/2007 | Foo |
| 7,264,177 | B2 | 9/2007 | Buck et al. |
| D557,817 | S | 12/2007 | Verfuerth |
| 7,307,542 | B1 | 12/2007 | Chandler et al. |
| D560,469 | S | 1/2008 | Bartol et al. |
| 7,369,056 | B2 | 5/2008 | McCollough, Jr. |
| 7,401,942 | B1 | 7/2008 | Verfuerth et al. |
| 7,446,671 | B2 | 11/2008 | Giannopoulos et al. |
| 7,518,531 | B2 | 4/2009 | Butzer et al. |
| D595,894 | S | 7/2009 | Verfuerth et al. |
| 7,563,006 | B1 | 7/2009 | Verfuerth et al. |
| 7,575,338 | B1 | 8/2009 | Verfuerth |
| D606,697 | S | 12/2009 | Verfuerth et al. |
| 7,628,506 | B2 | 12/2009 | Verfuerth et al. |
| 7,638,743 | B2 | 12/2009 | Bartol et al. |
| 7,660,652 | B2 | 2/2010 | Smith et al. |
| D617,028 | S | 6/2010 | Verfuerth et al. |
| D617,029 | S | 6/2010 | Verfuerth et al. |
| 7,738,999 | B2 | 6/2010 | Petite |
| 7,746,003 | B2 | 6/2010 | Verfuerth et al. |
| 7,762,861 | B2 | 7/2010 | Verfuerth et al. |
| D621,410 | S | 8/2010 | Verfuerth et al. |
| D621,411 | S | 8/2010 | Verfuerth et al. |
| 7,780,310 | B2 | 8/2010 | Verfuerth et al. |
| 7,784,966 | B2 | 8/2010 | Verfuerth et al. |
| D623,340 | S | 9/2010 | Verfuerth et al. |
| 7,812,543 | B2 * | 10/2010 | Budike, Jr. ........ H05B 37/0272 315/157 |
| 7,847,706 | B1 | 12/2010 | Ross et al. |
| 7,859,398 | B2 | 12/2010 | Davidson et al. |
| D632,006 | S | 2/2011 | Verfuerth et al. |
| 8,033,686 | B2 | 10/2011 | Recker et al. |

(56) References Cited

U.S. PATENT DOCUMENTS

| | | | |
|---|---|---|---|
| 8,035,320 B2 | 10/2011 | Sibert | |
| D650,225 S | 12/2011 | Bartol et al. | |
| 8,070,312 B2 | 12/2011 | Verfuerth et al. | |
| 8,138,690 B2 | 3/2012 | Chemel et al. | |
| 8,255,090 B2 | 8/2012 | Frader-Thompson et al. | |
| 8,344,665 B2 | 1/2013 | Verfuerth et al. | |
| 8,373,362 B2 | 2/2013 | Chemel et al. | |
| 8,376,600 B2 | 2/2013 | Bartol et al. | |
| 8,450,670 B2 | 5/2013 | Verfuerth et al. | |
| 8,531,134 B2 | 9/2013 | Chemel et al. | |
| 8,543,249 B2 | 9/2013 | Chemel et al. | |
| 8,610,377 B2 | 12/2013 | Chemel et al. | |
| 8,626,643 B2 | 1/2014 | Verfuerth et al. | |
| 8,779,340 B2 | 7/2014 | Verfuerth et al. | |
| 8,884,203 B2 | 11/2014 | Verfuerth et al. | |
| 8,921,751 B2 * | 12/2014 | Verfuerth | H05B 37/0272 250/205 |
| 2001/0055965 A1 | 12/2001 | Delp et al. | |
| 2002/0060283 A1 | 5/2002 | Jordan et al. | |
| 2002/0065583 A1 | 5/2002 | Okada et al. | |
| 2002/0082748 A1 | 6/2002 | Enga et al. | |
| 2002/0103655 A1 | 8/2002 | Boies et al. | |
| 2002/0162032 A1 | 10/2002 | Gundersen et al. | |
| 2002/0172049 A1 | 11/2002 | Yueh | |
| 2002/0173321 A1 | 11/2002 | Marsden et al. | |
| 2003/0011486 A1 | 1/2003 | Ying | |
| 2003/0016143 A1 | 1/2003 | Ghazarian | |
| 2003/0036820 A1 | 2/2003 | Yellepeddy et al. | |
| 2003/0041017 A1 | 2/2003 | Spool et al. | |
| 2003/0041038 A1 | 2/2003 | Spool et al. | |
| 2003/0046252 A1 | 3/2003 | Spool et al. | |
| 2003/0084358 A1 | 5/2003 | Bresniker et al. | |
| 2003/0084359 A1 | 5/2003 | Bresniker et al. | |
| 2003/0093332 A1 | 5/2003 | Spool et al. | |
| 2003/0171851 A1 | 9/2003 | Brickfield et al. | |
| 2003/0179577 A1 | 9/2003 | Marsh | |
| 2003/0229572 A1 | 12/2003 | Raines et al. | |
| 2004/0006439 A1 | 1/2004 | Hunter | |
| 2004/0024483 A1 | 2/2004 | Holcombe | |
| 2004/0076001 A1 | 4/2004 | Lutes | |
| 2004/0078153 A1 | 4/2004 | Bartone et al. | |
| 2004/0078154 A1 | 4/2004 | Hunter | |
| 2004/0083163 A1 | 4/2004 | Cooper | |
| 2004/0095237 A1 | 5/2004 | Chen et al. | |
| 2004/0128266 A1 | 7/2004 | Yellepeddy et al. | |
| 2004/0193329 A1 | 9/2004 | Ransom et al. | |
| 2004/0201448 A1 | 10/2004 | Wang | |
| 2004/0243377 A1 | 12/2004 | Roytelman | |
| 2005/0027636 A1 | 2/2005 | Gilbert et al. | |
| 2005/0034023 A1 | 2/2005 | Maturana et al. | |
| 2005/0035717 A1 | 2/2005 | Adamson et al. | |
| 2005/0038571 A1 | 2/2005 | Brickfield et al. | |
| 2005/0043860 A1 | 2/2005 | Petite | |
| 2005/0124346 A1 | 6/2005 | Corbett et al. | |
| 2005/0232289 A1 | 10/2005 | Walko et al. | |
| 2005/0265050 A1 | 12/2005 | Miller | |
| 2006/0002110 A1 | 1/2006 | Dowling et al. | |
| 2006/0044152 A1 | 3/2006 | Wang | |
| 2006/0044789 A1 | 3/2006 | Curtis | |
| 2006/0065750 A1 | 3/2006 | Fairless | |
| 2006/0085301 A1 | 4/2006 | Leahy | |
| 2006/0125426 A1 | 6/2006 | Veskovic et al. | |
| 2006/0253885 A1 | 11/2006 | Murphy et al. | |
| 2007/0027645 A1 | 2/2007 | Guenther et al. | |
| 2007/0043478 A1 | 2/2007 | Ehlers et al. | |
| 2007/0085701 A1 | 4/2007 | Walters et al. | |
| 2007/0097993 A1 | 5/2007 | Bojahra et al. | |
| 2007/0100571 A1 | 5/2007 | Miki | |
| 2007/0145915 A1 | 6/2007 | Roberge et al. | |
| 2007/0222581 A1 | 9/2007 | Hawkins et al. | |
| 2007/0247859 A1 | 10/2007 | Haddad et al. | |
| 2007/0252528 A1 | 11/2007 | Vermuelen et al. | |
| 2008/0143273 A1 | 6/2008 | Davidson et al. | |
| 2008/0147465 A1 | 6/2008 | Raines et al. | |
| 2008/0183337 A1 | 7/2008 | Szabados | |
| 2008/0218317 A1 | 9/2008 | Choi | |
| 2008/0266664 A1 | 10/2008 | Winston et al. | |
| 2008/0275802 A1 | 11/2008 | Verfuerth et al. | |
| 2008/0291054 A1 | 11/2008 | Groft | |
| 2008/0315772 A1 * | 12/2008 | Knibbe | G01S 13/825 315/149 |
| 2008/0316743 A1 | 12/2008 | Shaneour | |
| 2009/0000217 A1 | 1/2009 | Verfuerth et al. | |
| 2009/0059603 A1 | 3/2009 | Recker et al. | |
| 2009/0090895 A1 | 4/2009 | Hogan, Jr. | |
| 2009/0147507 A1 | 6/2009 | Verfuerth et al. | |
| 2009/0150004 A1 | 6/2009 | Wang et al. | |
| 2009/0222142 A1 | 9/2009 | Kao et al. | |
| 2009/0243517 A1 | 10/2009 | Verfuerth et al. | |
| 2009/0248217 A1 | 10/2009 | Verfuerth et al. | |
| 2009/0251066 A1 | 10/2009 | Baaijens et al. | |
| 2009/0299811 A1 | 12/2009 | Verfuerth et al. | |
| 2009/0315485 A1 | 12/2009 | Verfuerth et al. | |
| 2010/0061088 A1 | 3/2010 | Bartol et al. | |
| 2010/0246168 A1 | 9/2010 | Verfuerth et al. | |
| 2011/0060701 A1 | 3/2011 | Verfuerth et al. | |
| 2011/0146669 A1 | 6/2011 | Bartol et al. | |
| 2011/0235317 A1 | 9/2011 | Verfuerth et al. | |
| 2011/0279063 A1 | 11/2011 | Wang et al. | |
| 2012/0037725 A1 | 2/2012 | Verfuerth | |
| 2012/0038281 A1 | 2/2012 | Verfuerth | |
| 2012/0038490 A1 | 2/2012 | Verfuerth | |
| 2012/0040606 A1 | 2/2012 | Verfuerth | |
| 2012/0044350 A1 | 2/2012 | Verfuerth | |
| 2012/0081906 A1 | 4/2012 | Verfuerth et al. | |
| 2012/0167957 A1 | 7/2012 | Verfuerth et al. | |
| 2012/0274222 A1 | 11/2012 | Verfuerth et al. | |
| 2013/0006437 A1 | 1/2013 | Verfuerth et al. | |
| 2013/0033183 A1 | 2/2013 | Verfuerth et al. | |
| 2013/0094230 A1 | 4/2013 | Verfuerth et al. | |

FOREIGN PATENT DOCUMENTS

| | | |
|---|---|---|
| JP | 05-336868 | 12/1993 |
| JP | 2010-046091 | 3/2010 |
| WO | WO-2004/023849 A1 | 3/2004 |

OTHER PUBLICATIONS

Deru et al.; BigHorn Home Improvement Center Energy Performance; ASHRAE Transactions, Atlanta: 2006 vol. 112, 26 pages.

Galasiu et al. "Energy saving lighting control systems for open-plan offices: a filed study"; Jul. 2007, National Research Council Canada; vol. 4; No. 1, pp. 1-28, 56 pages.

Halliday, D., et al., Physics Part I and II; John Wiley& Sons, Inc. 1967 (9 pgs.).

Harris, L. R., et al., "Pacific Northwest Laboratory's Lighting Technology Screening Matrix," PNL-SA-23871, Apr. 1994, U.S. Department of Energy, Pacific Northwest Laboratory, Richland, Washington 99352, pp. 1-14.

Notice of Acceptance (NOA) from Miami-Dade County, Building Code Compliance Office, Product Control Division, Approval Date Dec. 13, 2007, 2 pages.

Sun-Dome /Tubular Skylight, Daylighting Technologies, Riviera Beach, FL, revision Oct. 22, 2007, 1 page.

* cited by examiner

OUTDOOR LIGHTING FIXTURES CONTROL SYSTEMS AND METHODS

CROSS-REFERENCE TO RELATED PATENT APPLICATIONS

This application is a continuation of U.S. application Ser. No. 13/932,962, filed Jul. 1, 2013, which is a Divisional of U.S. application Ser. No. 13/223,146, filed Aug. 31, 2011; U.S. application Ser. No. 13/223,146, filed Aug. 31, 2011 claims the benefit of priority under 35 U.S.C. § 119(e) of U.S. Provisional Application No. 61/380,165, filed on Sep. 3, 2010, and titled "Outdoor Lighting Fixtures Control Systems and Methods." U.S. application Ser. No. 13/223,146, filed Aug. 31, 2011 also claims the benefit of priority as a Continuation-In-Part of U.S. application Ser. No. 12/875,930, filed on Sep. 3, 2010, which claims the benefit of priority of U.S. Application No. 61/275,985, filed on Sep. 4, 2009. U.S. application Ser. No. 13/223,146, filed Aug. 31, 2011 also claims the benefit of priority as a Continuation-In-Part of U.S. application Ser. No. 12/550,270, filed on Aug. 28, 2009, which is a Continuation-In-Part of application Ser. No. 11/771,317, filed Jun. 29, 2007, and is also a Continuation-In-Part of U.S. Ser. No. 12/240,805, filed on Sep. 29, 2008, which is a Continuation-In-Part of U.S. application Ser. No. 12/057,217, filed Mar. 27, 2008. The subject matter of application Ser. Nos. 13/932,962, 13/223,146, 61/380,128, 61/275,985, 12/875,930, 12/550,270, 12/240,805, 12/057,217, and 11/771,317 are hereby incorporated herein by reference in their entirety.

BACKGROUND

The present invention relates generally to the field of outdoor lighting systems. The present invention more particularly relates to the field of outdoor lighting systems for illuminating streets.

Outdoor lights, such as street lights, can provide beneficial illumination throughout dusk, the night, and during early morning hours. Conventional outdoor lights remain fully lit regardless of whether any people or cars are nearby. Applicants have identified the need for improved outdoor lighting control systems and methods for saving energy and reducing the amount of light pollution provided by outdoor lights.

SUMMARY

One embodiment of the invention relates to a system for operating a plurality of streetlights in response to motion from a vehicle. The system includes a sensor associated with at least one of the streetlights and configured to detect the presence of a moving vehicle and to provide a signal representative of the moving vehicle. The system further includes a radio frequency transceiver associated with each of the streetlights. The system yet further includes processing electronics configured to receive the signal representative of the moving vehicle from the sensor and to cause the radio frequency transceiver to transmit a command to one or more of the plurality of the streetlights to change lighting states along a pathway for the vehicle. The sensor can detects a speed of the moving vehicle and streetlights in the pathway can be illuminated in a sequence that is at least as fast as the speed of the vehicle. The sensor can also or alternatively detect a direction of the moving vehicle relative to the pathway. Once activated, the streetlights can remain on for a predetermined period of time and then deactivate upon expiration of the predetermined period of time, reilluminating when the sensor detects the presence of another moving vehicle. The plurality of streetlights can be organized into zones and one or more of the zones may be completely or at least partially activated to illuminate the pathway. The streetlights can be high intensity discharge fluorescent lamps. The pathway can be a street, streets, a parking lot, a portion of a parking lot, or another pathway along which a vehicle travels.

One embodiment of the invention relates to a system for illuminating an outdoor area. The system includes a first outdoor lighting fixture and a first control circuit for the first outdoor lighting fixture. The system further includes a first radio frequency transceiver coupled to the control circuit via a wired communications link. The system yet further includes a sensor associated with the first outdoor lighting fixture and configured to provide a sensor output to the control circuit for the first outdoor light. The system also includes a second outdoor lighting fixture. The control circuit is configured to cause the first radio frequency transceiver to send data to the second outdoor lighting fixture in response to the sensor output. The second outdoor lighting fixture includes a second control circuit configured to use the data sent by the first radio frequency transceiver to determine whether to change lighting states.

Another embodiment of the invention relates to a method for illuminating an outdoor area. The method includes sensing motion using a sensor and a coupled control circuit and using the control circuit to cause a radio frequency transceiver to transmit a command to at least one lighting fixture. The method further includes receiving the command at the at least one lighting fixture and using processing electronics of the at least one lighting fixture to cause the at least one lighting fixture to change lighting states.

Another embodiment of the invention relates to a lighting fixture. The lighting fixture includes a first ballast for illuminating a first light and a second ballast for illuminating a second light. The lighting fixture further includes a motion sensor, a radio frequency transceiver, and a circuit coupled to the first ballast, the second ballast, the motion sensor, and the radio frequency transceiver. The circuit is configured to cause the first ballast to be in an activated state of operation such that the first light is illuminating and the second ballast to be in a deactivated state of operation such that the second light is not illuminated. The circuit is further configured to receive a signal from the motion sensor and to determine whether the signal is representative of motion. The circuit is yet further configured to respond to a determination that the signal is representative of motion by causing the second ballast to enter an activated state of operation such that the second light is illuminated. The circuit is further configured to cause the radio frequency transceiver to transmit at least one of a message indicating motion and an illuminate command for receipt by other lighting fixtures.

Another embodiment of the invention relates to a control device for a plurality of outdoor lighting fixtures. The control device includes a sensor and a radio frequency transceiver. The control device further includes processing electronics configured to receive a sensor input from the sensor and to cause the radio frequency transceiver to, in response to the sensor input, transmit a command to the plurality of outdoor lighting fixtures to change lighting states.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
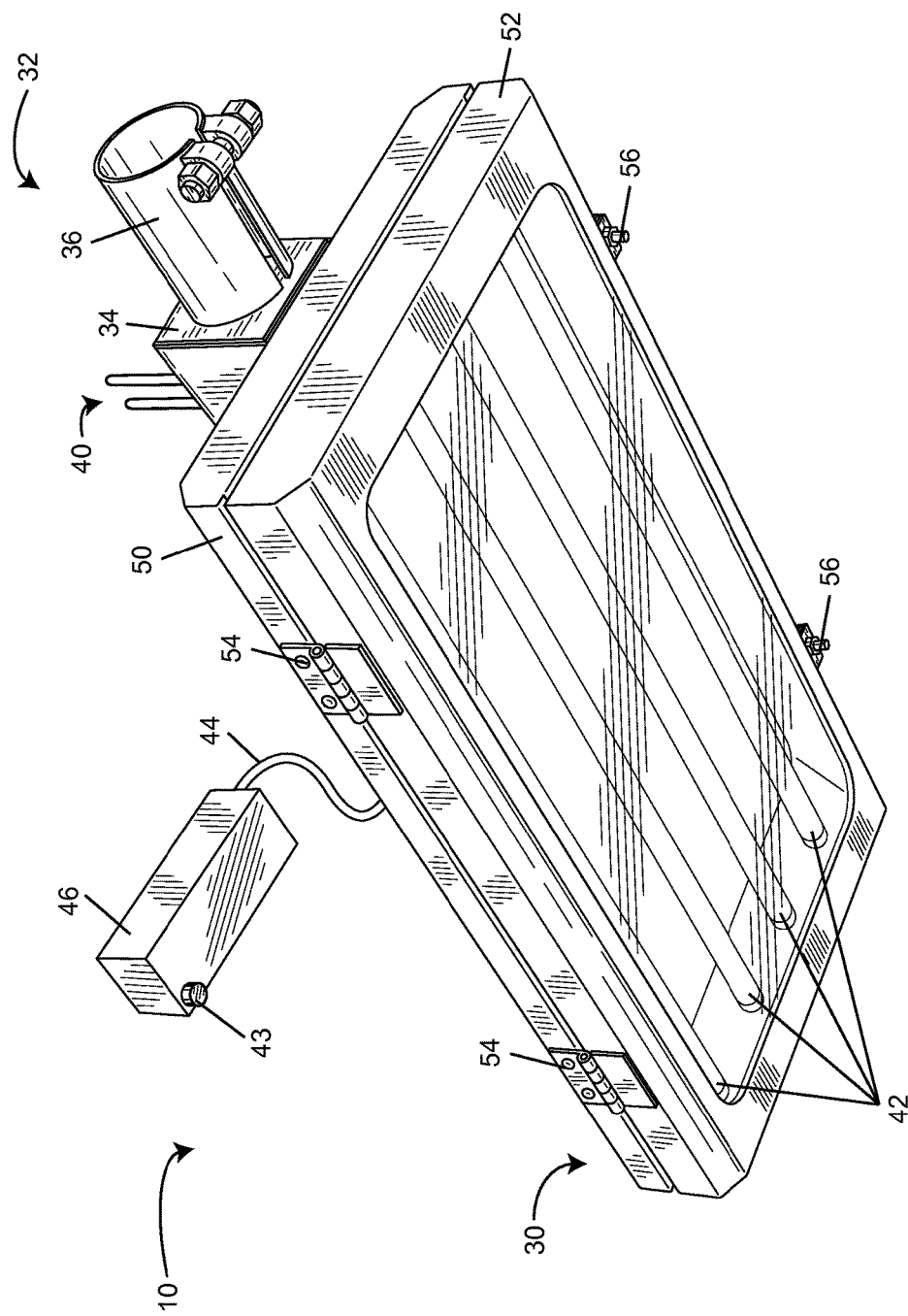
FIG. 1 is a bottom perspective view of an outdoor fluorescent lighting fixture system, according to an exemplary embodiment.

Referring generally to the Figures, one or more control devices are used to provide lighting commands or information to a plurality of outdoor lighting fixtures. The control device includes a sensor, a radio frequency transceiver, and processing electronics. The processing electronics are configured to receive sensor inputs from the sensor and to cause the radio frequency transceiver to transmit a command to the plurality of outdoor lighting fixtures in response to the sensor inputs. The outdoor lights that receive the command may be configured to change from a dimmed (e.g., partially illuminated, illuminated at partial intensity, "off" or not at all illuminated, etc.) lighting state to a brighter (e.g., fully illuminated, more illuminated, "on", etc.) lighting state. The sensor may be a motion sensor or a camera configured to detect the motion of a vehicle or a person. The processing electronics effectively "blasts" (i.e., transmits, broadcasts) radio frequency communications that announce the presence of the detected motion to other nearby lights. For example, if a sensor detects motion on a street due to a car driving down the street, the control device can use the detection of motion to blast a "lights on" command down the street in advance of the car, creating an effect whereby the road in front of the car illuminates. Such a control device and outdoor lighting fixture system can advantageously provide energy savings for street lights and other outdoor or lighting systems (e.g., parking lot systems, garage systems, warehouses, gas station canopy lights, rural roadways, highways, etc.) relative to similar systems where the lights are fully illuminated at all times or during all "lighting" hours. The energy savings may be particularly great in rural or remote areas where lighting is desired when the streets are populated but unnecessary for a large percentage of the time.

In some exemplary embodiments the lights can revert back to a dimmed or off state if no motion occurs within a predetermined amount of time. In some embodiments multiple of the outdoor lighting fixtures may include a motion sensor or camera and one or more of the outdoor lighting fixtures' control circuits may be configured to use timing between sensed motion to determine the speed of the moving object (e.g., how fast a car is driving down a street). The control circuit or circuits can blast lighting commands forward at a speed that is sufficient to provide a good visible range of lighting for nighttime driving at the sensed speed.

In yet other embodiments, a city or outdoor area may be divided into a plurality of zones. Outdoor lighting fixtures within the zone may be assigned a zone identifier. Whenever motion is detected within a zone, the controller coupled to the detecting sensor can transmit a signal to the other outdoor lighting fixtures in the zone with "on" lighting state command. The signal may include a representation of the zone for comparison by the receiving lighting fixtures to their zone identifiers. In such embodiments, an entire lighting zone may be configured to turn on or intensify the lighting if any motion is detected within the zone. A computer control system may be configured to transmit configuration information to the outdoor lighting fixtures and may be configured to provide graphical user interfaces for receiving user selections for use in the configuration. These graphical user interfaces may allow a user to assign zone identifiers to individual outdoor lighting fixtures, assign zones identifiers to different groups of outdoor lighting fixtures, reconfigure zone boundaries, and to configured the logic for the outdoor lighting fixtures of a zone. For example, the graphical user interface may provide controls for allowing a user to instruct the lighting fixtures in a zone to turn on based not only on motion within their zone, but also to turn on based on "motion" messages from adjacent zones.

Referring now to FIG. 1, a bottom perspective view of an outdoor fluorescent lighting fixture system is shown, according to an exemplary embodiment. The outdoor fluorescent lighting fixture of FIG. 1 is configured for applications such as a street lighting application or parking lot lighting application. In some embodiments, the outdoor fluorescent lighting fixture is configured to include a mounting system for coupling the fluorescent lighting fixture to high poles or masts. The outdoor fluorescent lighting fixture may also be configured to provide wired or wireless communications capabilities, one or more control algorithms (e.g., based on sensor feedback, received wireless commands or wireless messages, etc.), built-in redundancy, and venting. Many of the outdoor lighting fixtures described herein may advantageously mount to existing street light poles or other outdoor structures for holding lighting fixtures such that no modification to the existing infrastructure (other than replacing the lighting fixture itself) is necessary. In some embodiments, the outdoor lighting fixtures include control circuits for providing energy saving control features to a group of lighting fixtures or a municipality without changing existing power wiring run from pole to pole.

In FIG. 1, outdoor lighting fixture 10 is configured for coupling to a pole and for directing light generally toward the ground. Such an orientation may be used to illuminate streets, sidewalks, bridges, parking lots, and other outdoor areas where ground illumination is desirable. Outdoor lighting fixture 10 is shown to include a mounting system 32 and a housing 30 (e.g., fluorescent tubes) and includes a lens (e.g., a plastic sheet, a glass sheet, etc.) that allows light from the one or more fluorescent lamps 12 to be provided from housing 30.

Mounting system 32 is shown to include a mount 34 and a compression sleeve 36. Compression sleeve 36 is configured to receive the pole and to tighten around the pole (e.g., when a clamp is closed, when a bolt is tightened, etc.). Compression sleeve 36 may be sized and shaped for attachment to existing outdoor poles such as street light poles, sidewalk poles, parking lot poles, and the like. As is provided by mounting system 32, the coupling mechanism may be mechanically adaptable to different poles or masts. For example, compression sleeve 36 may include a taper or a tapered cut so that compression sleeve 36 need not match the exact diameter of the pole or mast to which it will be coupled. While lighting fixture 10 shown in FIG. 1 utilizes a compression sleeve 36 for the mechanism for coupling the mounting system to a pole or mast, other coupling mechanisms may alternatively be used (e.g., a two-piece clamp, one or more arms that bolt to the pole, etc.).

According to an exemplary embodiment, fixture 10 and housing 30 are elongated and mount 34 extends along the length of housing 30. Mount 34 is preferably secured to housing 30 in at least one location beyond a lengthwise center point and at least one location before the lengthwise center point. In other exemplary embodiments, the axis of compression sleeve 36 also extends along the length of housing 30. In the embodiment shown in FIG. 1, compression sleeve 36 is coupled to one end of mount 34 near a lengthwise end of housing 30.

Housing 30 is shown to include a fixture pan 50 and a door frame 52 that mates with fixture pan 50. In the embodiments shown in the Figures, door frame 52 is mounted to fixture pan 50 via hinges 54 and latches 56. When latches 56 are released, door frame 52 swings away from fixture pan 50 to allow access to fluorescent lamps 12 within housing 30. Latches 56 are shown as compression-type latches, although many alternative locking or latching mechanisms may be alternatively or additionally provided to secure the different sections of the housing. In some embodiments the latches may be similar to those found on "NEMA 4" type junction boxes or other closures. Further, many different hinge mechanisms may be used. Yet further, in some embodiments door frame 52 and fixture pan 50 may not be joined by a hinge and may be secured together via latches 56 on all sides, any number of screws, bolts or other fasteners that do not allow hinging, or the like. In an exemplary embodiment, fixture pan 50 and door frame 52 are configured to sandwich a rubber gasket that provides some sealing of the interior of housing 30 from the outside environment. In some embodiments the entirety of the interior of lighting fixture 10 is sealed such that rain and other environmental moisture does not easily enter housing 30. Housing 30 and its component pieces may be galvanized steel but may be any other metal (e.g., aluminum), plastic, and/or composite material. Housing 30, mounting system 32 and/or the other metal structures of lighting fixture 10 may be powder coated or otherwise treated for durability of the metal. According to an exemplary embodiment housing 30 is powder coated on the interior and exterior surfaces to provide a hard, relatively abrasion resistant, and tough surface finish.

Housing 30, mounting system 32, compression sleeve 36, and the entirety of lighting fixture 10 are preferably extremely robust and able to withstand environmental abuses of outdoor lighting fixtures. The shape of housing 30 and mounting system 32 are preferably such that the effective projection area (EPA) relative to strong horizontal winds is minimized—which correspondingly provides for minimized wind loading parameters of the lighting fixture.

Ballasts, structures for holding lamps, and the lamps themselves may be installed to the interior of fixture pan 50. Further, a reflector may be installed between the lamp and the interior metal of fixture pan 50. The reflector may be of a defined geometry and coated with a white reflective thermosetting powder coating applied to the light reflecting side of the body (i.e., a side of the reflector body that faces toward a fluorescent light bulb). The white reflective coating may have reflective properties, which in combination with the defined geometry of the reflector, provides high reflectivity. The reflective coating may be as described in U.S. Prov. Pat. App. No. 61/165,397, filed Mar. 31, 2009. In other exemplary embodiments, different reflector geometries may be used and the reflector may be uncoated or coated with other coating materials. In yet other embodiments, the reflector may be a "MIRO 4" type reflector manufactured and sold by Alanod GmbH & Co KG.

The shape and orientation of housing 30 relative to the reflector and/or the lamps is configured to provide a substantially full cut off such that light does not project above the plane of fixture pan 50. The lighting fixtures described herein are preferably "dark-sky" compliant or friendly.

To provide further resistance to environmental variables such as moisture, housing 30 may include one or more vents configured to allow moisture and air to escape housing 30 while not allowing moisture to enter housing 30. Moisture may enter enclosed lighting fixtures due to vacuums that can form during hot/cold cycling of the lamps. According to an exemplary embodiment, the vents include, are covered by, or are in front of one or more pieces of material that provide oleophobic and hydrophobic protection from water, washing products, dirt, dust and other air contaminants. According to an exemplary embodiment the vents may include GORE membrane sold and manufactured by W.L. Gore & Associates, Inc. The vent may include a hole in the body of housing 30 that is plugged with a snap-fit (or otherwise fit) plug including an expanded polytetrafluoroethylene (ePTFE) membrane with a polyester non-woven backing material.

The lighting fixture system includes a controller 46. Controller 46 is connected to lighting fixture 10 via wire 44. Controller 46 is configured to control the switching between different states of lighting fixture 10 (e.g., all lamps on, all lamps off, some lamps on, etc.).

According to various embodiments, controller 46 is further configured to log usage information for lighting fixture 10 in a memory device local to controller 46. Controller 46 may further be configured to use the logged usage information to affect control logic of controller 46. Controller 46 may also or alternatively be configured to provide the logged usage information to another device for processing, storage, or display. Controller 46 is shown to include a sensor 43 coupled to controller 46 (e.g., controller 46's exterior housing). Controller 46 may be configured to use signals received from sensor 43 to affect control logic of controller 46. Further, controller 46 may be configured to provide information relating to sensor 43 to another device.

While various Figures of the present disclosure, including FIG. 1, illustrate lighting fixtures for fluorescent lamps, it should be noted that embodiments of the present disclosure may be utilized with any type of lighting fixture and/or lamps. Further, while housing 30 is shown as being fully enclosed (e.g., having a door and window covering the underside of the fixture), it should be noted that any variety of lighting fixture shapes, styles, or types may be utilized with embodiments of the present disclosure. Further, while controller 46 is shown as having a housing that is exterior to housing 30 of lighting fixture 10, it should be appreciated that controller 46 may be physically integrated with housing 30. For example, one or more circuit boards or circuit elements of controller 46 may be housed within, on top of, or otherwise secured to housing 30. Further, in other exemplary embodiments, controller 46 (including its housing) may be coupled directly to housing 30. For example, controller 46's housing may be latched, bolted, clipped, or otherwise coupled to the interior or exterior of housing 30. Controller 46's housing may generally be shaped as a rectangle (as shown), may include one or more non-right angles or curves, or otherwise configured. In an exemplary embodiment, controller 46's housing is made of plastic and housing 30 for lighting fixture 10 is made from metal. In other embodiments, other suitable materials may be used.

Referring still to FIG. 1, lighting fixture 10 includes antennas 40 which are coupled to radio frequency transceiver circuitry contained in lighting fixture 10. In alternative embodiments antennas 40 are located on controller 46 and controller 46 is held above, below, or laterally relative to outdoor lighting fixture 10 on the pole or mast to which outdoor lighting fixture 10 is coupled. In the embodiment shown in FIG. 1, antennas 40 are coupled to the top of mounting system 32 and the radio frequency transceiver for antennas 40 is housed within one of mounting system 32, housing 30, and the housing of controller 46. While multiple antennas for the radio frequency transceiver may be provided to outdoor lighting fixture 10, in other embodiments only a single antenna is coupled to outdoor lighting fixture 10's radio frequency transceiver. According to various embodiments, antennas 40 can be configured to support a multiple-input and multiple-out (MIMO) antenna configuration, a single-input and multiple-output antenna configuration (SIMO), a multiple-input and single-output antenna configuration (MISO), a single-input and single-output antenna configuration (SISO), or otherwise. According to an exemplary embodiment antennas 40 are configured (e.g., tuned) to provide 2.4 ghz WiFi communications capabilities. In other exemplary embodiments antennas 40 are configured (e.g., tuned, controlled to, etc.) provide 5.8 ghz WiFi communications capabilities. In yet other exemplary embodiments other wireless networking protocols, communications capabilities, standards, or proprietary communications schemes may be implemented in outdoor lighting fixture 10 and by antennas 40. Antennas 40 will be shaped, sized, and located appropriately relative to outdoor lighting fixture 10 based on the protocols, communications schemes, and other radio frequency design considerations. In an exemplary embodiment antennas 40 are used by a radio frequency transceiver located with lighting fixture 10, inside housing 30, or otherwise located to provide a wireless networking access point or "hotspot." Accordingly, once the radio frequency transceiver and antennas 40 of lighting fixture 10 are active, users may use laptops, desktops, or portable electronic devices having radio frequency transceivers to wirelessly communicate with the radio frequency transceiver and antennas 40 of lighting fixture 10. Using an uplink connection of the radio frequency transceiver (e.g., provided by a wired high speed networking line, provided via a wireless hop to another device or network, etc.) outdoor lighting fixture 10 can use antennas 40 and the associated radio frequency transceiver to serve as a router or bridge to, for example, the Internet.

Figure 2:
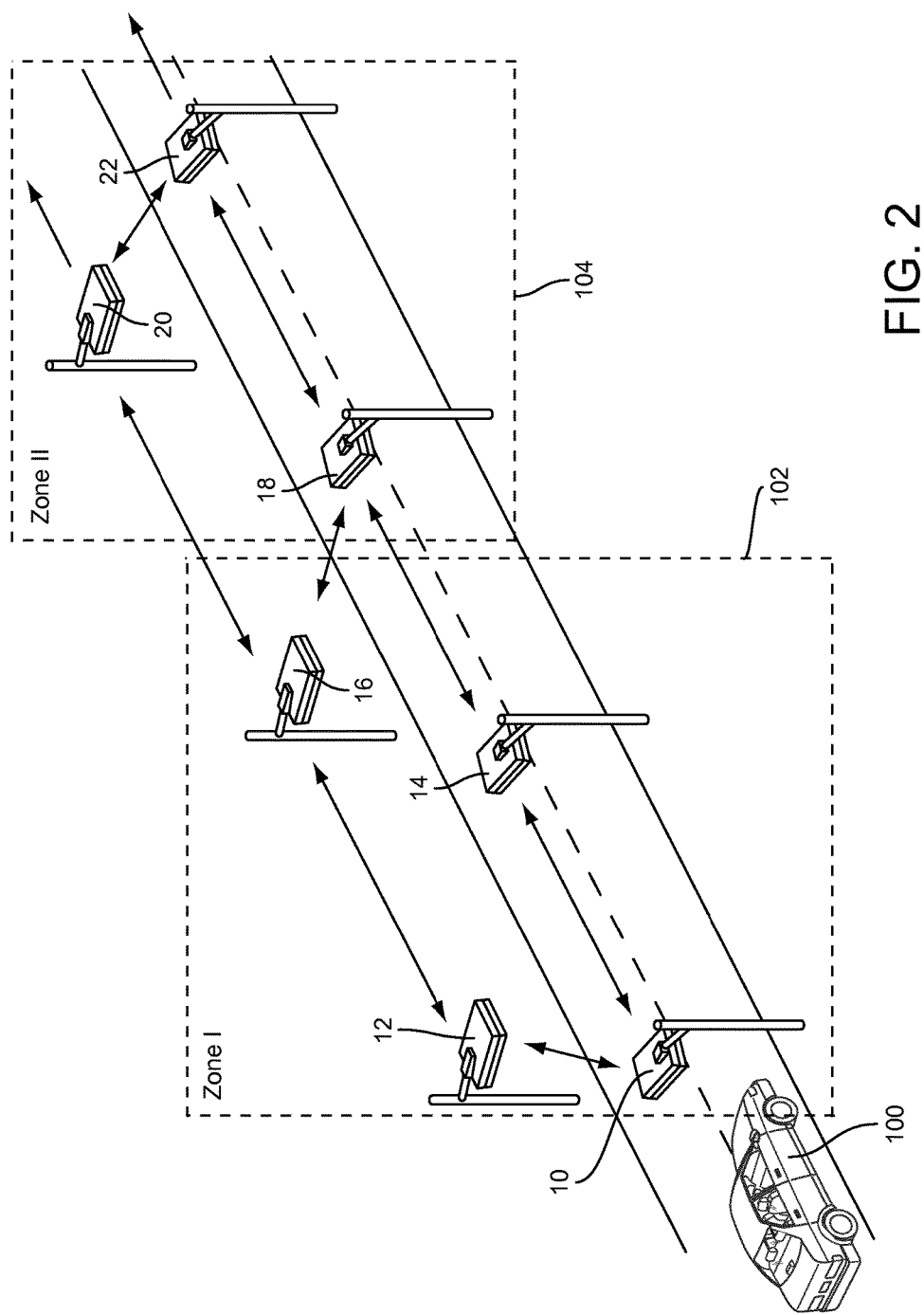
FIG. 2 is an illustration of a system for illuminating an outdoor area using multiple of the lighting fixtures of FIG. 1, according to an exemplary embodiment.

Referring now to FIG. 2, an illustration of a system for illuminating an outdoor area such as a street is shown, according to an exemplary embodiment. The system may include multiple zones (e.g., zone 102 or "Zone I" and zone 104 or "Zone II") and multiple lighting fixtures within each zone 102, 104. For example, lighting fixtures 10, 12, 14, 16 are in zone 102 and lighting fixtures 18, 20, 22 are in zone 104. Any of lighting fixtures 10-22 may include sensors (e.g., a motion sensor) configured to detect motion. For example, lighting fixture 10 may include a motion sensor for detecting a vehicle approaching zone 102 (e.g., vehicle 100).

In the embodiment of FIG. 2, a sensor of fixture 10 may detect vehicle 100 approaching zone 102. A radio frequency transceiver of fixture 10 may be configured to provide a sensor output related to the detection of vehicle 100 to the other fixtures 12, 14, 16 of zone 102. For example, in the embodiment of FIG. 2, fixture 10 may provide a wireless data transmission to fixtures 12, 14 indicating that vehicle 100 is present. Fixtures 12, 14 may use the provided sensor output to determine to change states from an "off" state to an "on" state. Fixtures 12, 14 may additionally provide the sensor output to additional fixtures (e.g., fixtures 16) such that all lighting fixtures within zone 102 are provided the sensor output. The lighting fixtures of zone 102 may additionally provide the sensor output to zone 104 and any other zones. For example, fixtures 14, 16 may transmit the sensor output to fixtures 18, 20 of zone 104, and the sensor output may be transmitted throughout zone 104 to other lighting fixtures (e.g., fixture 22). Such a configuration may allow the lighting fixtures of a particular zone (e.g., zone 102) to turn on when a sensor of one of the lighting fixtures (e.g., fixture 10) detects vehicle 100. Such a configuration may further allow additional zones (e.g., zone 104 and further zones) to turn on their associated lighting fixtures when a previous zone detects vehicle 100, before vehicle 100 approaches the zone. According to an exemplary embodiment, the range of how many zones to send the sensor output to may depend upon environmental factors (e.g., inclement weather, if it is nighttime, if it is foggy, etc.).

Referring further to FIG. 2, one or more lighting fixtures may receive data from a remote or local controller. For example, lighting fixture 10 may receive data from a master controller either wirelessly, via a wired connection, or from a controller within fixture 10, relating to operation of fixture 10 and all fixtures in zones 102, 104, or other zones. For example, lighting fixture 10 may receive a command to change to an "on" state and may transmit the command to other lighting fixtures in zones 102, 104 as a result.

Figure 3A:
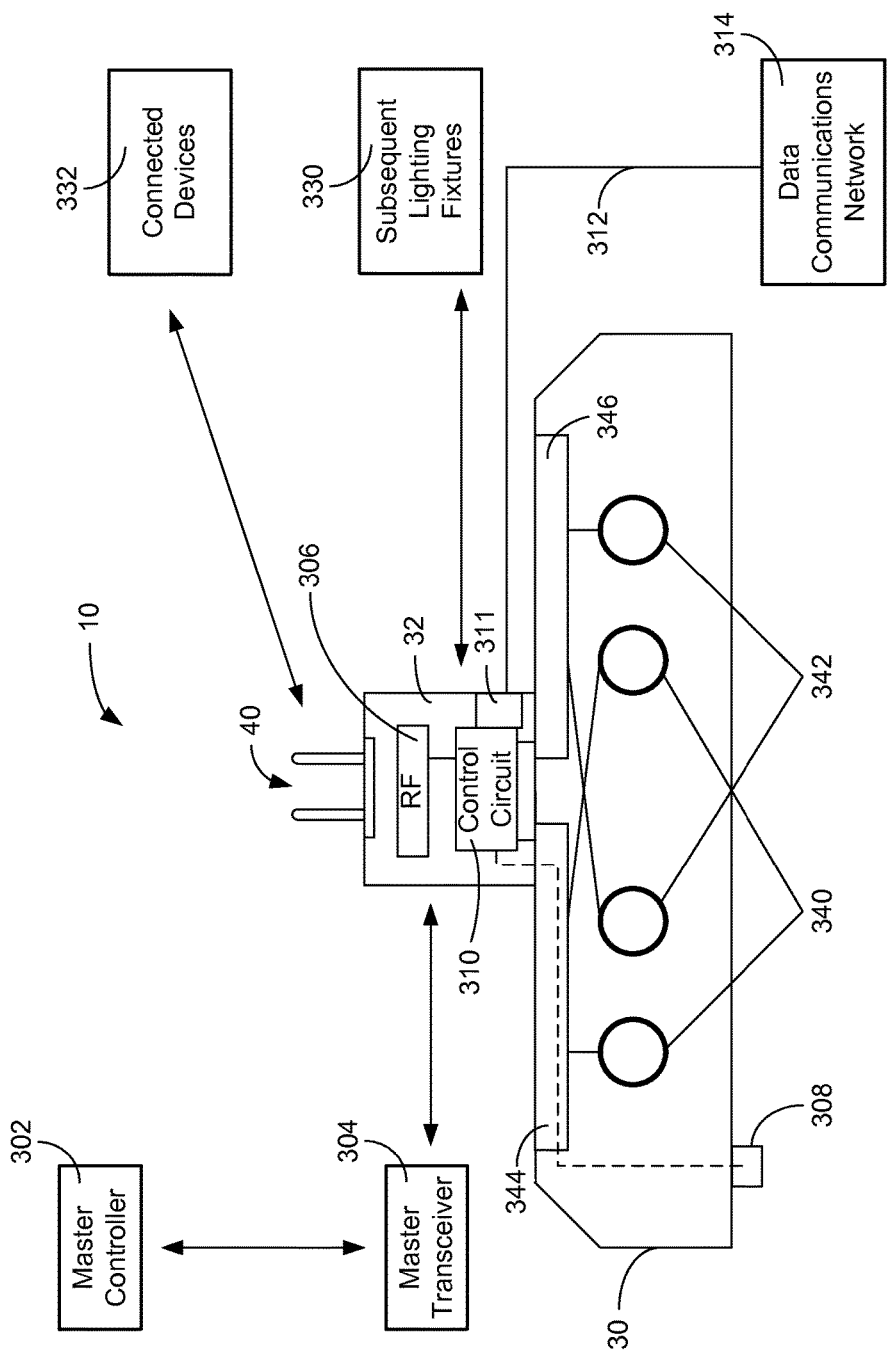
FIG. 3A is a diagram of a system for controlling a street light of the system of FIG. 2, according to an exemplary embodiment.

FIG. 3A is a diagram of a system for controlling a lighting fixture 10 according to an exemplary embodiment. Lighting fixture 10 includes housing 30 and mounting system 32 as described in the embodiment of FIG. 1. Electronics for lighting fixture 10 are shown inside mounting system 32. The electronics may be user-accessible via an opening in mounting system 32. The diagram shown in FIG. 3A illustrates two lamp sets 340, 342 with two fluorescent lamps forming each lamp set 340, 342. Each lamp set 340, 342 may include one or any number of additional fluorescent lamps. Further, while some embodiments described herein relate to providing redundant lamp sets and ballasts, it should be appreciated that many embodiments of the present disclosure may only include a single lamp set and a single ballast. In other embodiments more than two ballasts and lamp sets may be included in a single lighting fixture. While the fluorescent lamps are illustrated as tube lamps extending lengthwise relative to the lighting fixture, the fluorescent lamps may be compact fluorescent bulbs, run perpendicular to the length of the lighting fixture, or be otherwise oriented.

Referring still to FIG. 3A, the fixture mounting system is shown to include a control circuit 310 and a radio frequency transceiver 306 communicably connected to control circuit 310. Control circuit 310 is coupled to ballasts 344, 346 and is configured to provide control signals to ballasts 344, 346. Control circuit 310 may be coupled to a relay or relays so that control circuit 310 controllably switches the relay from providing power to ballasts 344, 346 or from restricting power to ballasts 344, 346. Ballasts 344, 346 may be configured to provide different lighting (e.g., ballast 344 may be configured for relatively dim lighting and ballast 346 may be configured for full lighting). According to an exemplary embodiment, the system shown in FIG. 3A is configured to receive control signals from a master controller 302 or a master transceiver 304 via radio frequency transceiver 306. In other embodiments the system shown in FIG. 3A is also configured to provide information to one or more remote sources via radio frequency transceiver 306.

In an exemplary embodiment radio frequency transceiver 306 is a WiFi transceiver configured to serve as a wireless access point. Outdoor lighting fixture 10 is further shown to include a wired uplink interface 311. Wired uplink interface 311 may be or include a wire terminal, hardware for interpreting analog or digital signals received at the wire terminal, or one or more jacks, connectors, plugs, filters, or other hardware (or software) for receiving and interpreting signals received via the wire 312 from a data communications network 314 (e.g., a remote source). Radio frequency transceiver 306 may include an encoder, a modulator, an amplifier, a demodulator, a decoder, an antenna, one or more filters, one or more buffers, one or more logic modules for interpreting received transmissions, and/or one or more logic modules for appropriately formatting transmissions. Fixture 10 is further shown to include antennas 40 as described in FIG. 1. Antennas 40 are configured to communicate with subsequent lighting fixtures 330 (e.g., the "next" lighting fixtures down the street) or other connected devices 332.

The circuit shown in FIG. 3A is shown as being entirely enclosed within mounting system 32 and as a single unit (e.g., single PCB, flexible PCB, separate PCB's but closely coupled). In other embodiments, however, the circuit may be distributed (e.g., having some components outside of mounting system 32, having some components within housing 30, etc.).

FIG. 3A is further shown to include an environment sensor 308. Environment sensor 308 is shown coupled to the underside of housing 30. In other embodiments, sensor 308 may be installed at the top of mounting system 32, within housing 30, or in any other area of lighting fixture 10. In yet other embodiments, environment sensor 308 may be remote from the fixture itself (e.g., coupled to a lower location on the pole, coupled to a street sign, coupled to a stop light, etc.). It should further be mentioned that one environment sensor 308 may serve multiple fixtures. This may be accomplished by environment sensor 308 providing output signals to multiple fixtures or by environment sensor 308 providing output signals to a single fixture which is configured to forward the signals (or a representation or message derived from the signals) to other fixtures or to a master controller 302 for action. Environment sensor 308 may be an occupancy sensor, a motion sensor, a photocell, an infrared sensor, a temperature sensor, or any other type of sensor for supporting the activities described herein. Control circuit 310 coupled to environment sensor 308 may be configured to cause lamps 340, 342 to illuminate when movement is detected or based on some other logic determination using sensor input. In an exemplary embodiment, control circuit 310 may also be configured to cause signals to be transmitted by radio frequency transceiver 306 to a security monitor observed by security personnel. Receipt of these signals may cause a system controlling a pan-tilt-zoom security camera to aim toward the area covered by a light. The signals (or other alerts) may also be sent to other locations such as a police station system for action. For example, if activity continues occurring in a parking lot after-hours, as detected by occupancy sensors on a system of lighting fixtures as described herein, the lighting fixtures can each communicate (wired, wirelessly, etc.) this activity to a master controller and the master controller may send a request for inspection to security or police. Control circuit 310 may also be configured to turn the lighting fixture on for a period of time prior to turning the lighting fixture off if no further occupancy is detected.

Figure 3B:
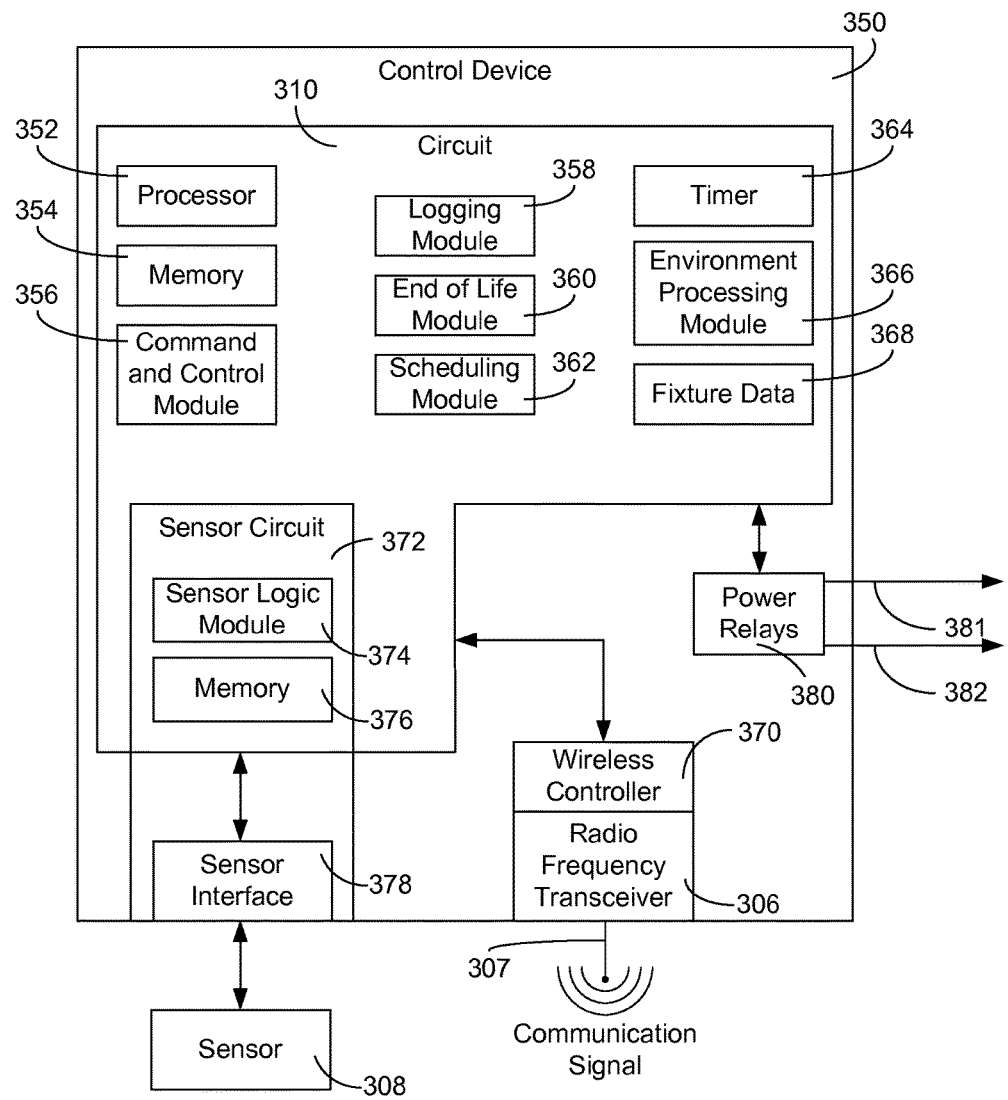
FIG. 3B is a block diagram of the controller and circuit of the system of FIG. 3A, according to an exemplary embodiment.

Referring now to FIG. 3B, a block diagram of a control device 350 and circuit 310 illustrated in FIG. 3A is shown, according to an exemplary embodiment. In some embodiments activities of circuit 310 are controlled or facilitated using one or more processors (e.g., a programmable integrated circuit, a field programmable gate array, an application specific integrated circuit, a general purpose processor, a processor configured to execute instructions it receives from memory, etc.). In other embodiments, activities of circuit 310 are controlled and facilitated without the use of one or more processors and are implemented via a circuit of analog and/or digital electronics components. Circuit 310 includes processor 352 and memory 354. Processor 352 may be a general purpose processor, a specific purpose processor, a programmable logic controller (PLC), a field programmable gate array, a combination thereof, or otherwise and configured to complete, cause the completion of, and/or facilitate the completion of the activities of circuit 310. Memory 354 of circuit 310 may be computer memory, semiconductor-based, volatile, non-volatile, random access memory, flash memory, magnetic core memory, or any other suitable memory for storing information. Processor 352 may operate to execute computer code stored in memory 354 or in any other logic module of control device 350. Processor 352 may, for example, include computer code for completing the steps shown in FIG. 4A-B. To complete the steps shown in FIG. 4A, processor 352 may, for example, continuously loop through a timing and input checking algorithm, load new functions as needed, and communicate with hardware such as the sensor and the radio frequency transceiver.

The circuit is further shown to include a communications interface (e.g., radio frequency (RF) transceiver 306) and a sensor interface 378. RF transceiver 306 may be integrated with circuit 310 rather than being separate. In other embodiments, RF transceiver 306 may be configured to control, drive, or otherwise communicate with the communications interface shown in FIG. 3A. In yet other embodiments, RF transceiver 306 may be of a first type and the communications interface shown in FIG. 3A may be of a second type. For example, RF transceiver 306 may be a wire interface for communicating with existing municipal street light circuits, schedulers, or networks while the communications interface of FIG. 3A may be a radio frequency transceiver for communicating with other remote sources or networks. In the present disclosure, the term transceiver may refer to an integrated transmitter and receiver pair or a separate transmitter and receiver.

Sensor interface 378 may be configured to receive signals from environment sensor 308. Sensor interface 378 may include any number of jacks, terminals, solder points or other connectors for receiving a wire or lead from environment sensor 308. Sensor interface 378 may also or alternatively be a radio frequency transceiver or receiver for receiving signals from wireless sensors. For example, sensor interface 378 may be a Bluetooth protocol compatible transceiver, a ZigBee transceiver, or any other standard or proprietary transceiver. Regardless of the communication medium used, sensor interface 378 may include filters, analog to digital converters, buffers, or other components configured to handle signals received from environment sensor 308. Sensor interface 378 may be configured to provide the result of any signal transformation (or the raw signal) to circuit 310 for further processing.

Circuit 310 is further shown to include a command and control module 356, a logging module 358, an end of life module 360, a scheduling module 362, a timer 364, an environment processing module 366, and fixture data 368. Using signals received from communications electronics of the lighting fixture and/or signals received from one or more sensors (e.g., photocells, occupancy sensors, etc.), command and control module 356 is configured to control the ballasts and lamps of the fixture. Command and control module 356 may include the primary control algorithm/loop for operating the fixture and may call, initiate, pass values to, receive values from, or otherwise use the other modules of the circuit. For example, command and control module 356 may primarily operate the fixture using a schedule as described below with respect to scheduling module 362, but may allow upstream or peer control (e.g., "override control") to allow a remote source to cause the ballast/lamps to turn on or off. Command and control module 356 may be used to control two-way communication using communications electronics of the lighting fixture.

Logging module 358 is configured to identify and store fixture event information. For example, logging module 358 may be configured to identify (e.g., by receiving a signal from another component of the circuit) when the lamps of the fixture are being or have been turned off or turned on. These events may be recorded by logging module 358 with a date/time stamp and with any other data. For example, logging module 358 may record each event as a row in a two dimensional table (e.g., implemented as a part of a relational database, implemented as a flat file stored in memory, etc.) with the fields such as event name, event date/time, event cause, event source. One module that may utilize such information is end of life module 360. End of life module 360 may be configured to compile a time of use total by querying or otherwise aggregating the data stored by logging module 358. Events logged by the system may be transmitted using the communications interfaces or other electronics to a remote source via a wired or wireless connection. Messages transmitting logged events or data may include an identifier unique to the lighting fixture (e.g., lighting fixture's communication hardware) that identify the fixture specifically. In addition to the activities of end of life module 360, command and control module 356 may be configured to cause communications electronics of the fixture to transmit messages from the log or other messages upon identifying a failure (e.g., a power supply failure, a control system failure, a ballast failure, a lamp failure, etc.). While logging module 358 may be primarily used to log on/off events, logging module 358 (or another module of the control system) may log energy draw (or some value derived from energy draw such as a carbon equivalent amount) by the lighting fixture.

FIG. 3B is further shown to include a scheduling module 362. Scheduling module 362 may be used by the circuit to determine when the lamps of the lighting fixture should be turned on or off. Scheduling module 362 may only consider time, or may also consider inputs received from environment sensor 308 (e.g., indicating that it is night out and that artificial light is necessary). Scheduling module 362 may access a schedule stored in memory 354 of the circuit to carry out its tasks. In some embodiments schedule data may be user-updatable via a remote source and transmitted to the fixture via the circuit and a communications interface. While end of life module 360 may utilize an actual log of fixture events as described in the previous paragraph, in some embodiments end of life module 360 may utilize scheduling information to make an end of life determination. In yet other embodiments, logging module 358 may receive data from scheduling module 362 to create its log. Control device 350 and circuit 310 is further shown to include a timer 364 that may be used by circuit 310 to maintain a date/time for use by or for checking against information of scheduling module 362, end of life module 360, or logging module 358. Environment processing module 366 may be configured to process signals received from one or more sensors such as environment sensor 308. Environment processing module 366 may be configured to, for example, keep the lamp of the lighting fixture turned off between the hours of one and five A.M. if there is no movement detected by a nearby environment sensor. In other embodiments, environment processing module 366 may interpret the signals received from sensors but may not make final fixture behavior determinations. In such embodiments, a main logic module for the circuit or logic included in processor 352 or memory 354 may make the fixture behavior determinations using input from, for example, environment processing module 366, scheduling module 362, timer 364, and fixture data 368.

Referring further to FIG. 3B, control device 350 includes circuitry configured with an algorithm to control on/off cycling of connected lighting fixtures, an algorithm to log usage information for the lighting fixture, an algorithm configured to prevent premature restrikes to limit wear on the lamps and ballast, and an algorithm configured to allow control device 350 to send and receive commands or information from other peer devices independently from a master controller or master transceiver.

Control device 350 is shown to include power relays 380 configured to controllably switch on or off high voltage power outputs that may be provided to first ballast 344 and second ballast 346 of FIG. 3A via wires 381, 382. It should be noted that in other exemplary embodiments, power relays 380 may be configured to provide a low voltage control signal, optical signal, or otherwise to the lighting fixture which may cause one or more ballasts, lamps, and/or circuits of the fluorescent lighting fixture that the controller serves to turn on and off. While power relays 380 are configured to provide high voltage power outputs to ballasts 344, 346, it should be appreciated that control device 350 may include a port, terminal, receiver, or other input for receiving power from a high voltage power source. In embodiments where a relatively low voltage or no voltage control signal is provided by relays 380, power for circuitry of control device 350 may be received from a power source provided to the lighting fixtures or from another source. In any embodiment of control device 350, appropriate power supply circuitry (e.g., filtering circuitry, stabilizing circuitry, etc.) may be included with control device 350 to provide power to the components of control device 350 (e.g., relays 380).

Referring still to FIG. 3B, control device 350 is shown to include wireless controller 370 and RF transceiver 306 which may provide data to circuit 310. Circuit 310 provides data or control signals to power relays 380. Sensor circuit 372 includes sensor logic module 374, sensor memory 376, and sensor interface 378. Wireless controller 370 is configured to cause one or more lamps of the fluorescent lighting fixture to turn on and off via control signals sent to power relays 380. Wireless controller 370 can make a determination that an "on" or "off" signal should be sent to power relays 380 based on inputs received from sensor circuit 372 or RF transceiver 306. For example, a command to turn the lighting fixture "off" may be received at RF transceiver 306 and interpreted by wireless controller 370. Upon recognizing the "off" command, wireless controller 370 provides an appropriate control signal to sensor circuit 372 which causes a switch of one or more of power relays 380 off. Similarly, when sensor 308 experiences an environmental condition, sensor logic module 374 may determine whether or not wireless controller 370 should change "on/off" states. For example, if a high ambient lighting level is detected by sensor 308, sensor logic module 374 may determine that wireless controller 370 should change states such that power relays 380 are "off" Conversely, if a low ambient lighting level is detected by sensor 308, sensor logic module 374 may cause wireless controller 370 to turn power relays 380 "on." Other control decisions, logic and activities provided by control device 350 and the components thereof are described below and with reference to other Figures.

When or after control decisions based on sensor 308 or commands received at RF transceiver 306 are made, in some exemplary embodiments, sensor logic module 374 is configured to log usage information for the lighting fixture in sensor memory 376. For example, if wireless controller 370 causes power relays 380 to change states such that the lighting fixture turns on or off, wireless controller 370 may inform sensor logic module 374 of the state change and sensor logic module 374 may log usage information based on the information from wireless controller 370. The form of the logged usage information can vary for different embodiments. For example, in some embodiments, the logged usage information includes an event identifier (e.g., "on", "off", cause for the state change, etc.) and a timestamp (e.g., day and time) from which total usage may be derived. In other embodiments, the total "on" time for the lighting fixture (or lamp set) is counted such that only an absolute number of hours that the lamp has been on (for whatever reason) has been tracked and stored as the logged usage information. In addition to logging or aggregating temporal values, each sensor logic module 374 may be configured to process usage information or transform usage information into other values or information. For example, in some embodiments time-of-use information is transformed by sensor logic module 374 to track the energy used by the lighting fixture (e.g., based on bulb ratings, known energy draw of the fixture in different on/off/partial on modes, etc.). In some embodiments, each sensor logic module 374 will also track how much energy savings the lighting fixture is achieving relative to a conventional lighting fixture, conventional control logic, or relative to another difference or change of the lighting fixture. For the purposes of many embodiments of this disclosure, any such information relating to usage for the lighting fixture may be considered logged "usage information." In other embodiments, the usage information logged by sensor logic module 374 is limited to on/off events or temporal aggregation of on states; in such embodiments energy savings calculations or other calculations may be completed by a master controller 302 or another remote device.

In an exemplary embodiment, control device 350 (e.g., via wireless transceiver 306) is configured to transmit the logged usage information to remote devices such as master controller 302. Wireless controller 370 may be configured to recall the logged usage information from sensor memory 376 at periodic intervals (e.g., every hour, once a day, twice a day, etc.) and to provide the logged usage information to RF transceiver 306 at the periodic intervals for transmission back to master controller 302. In other embodiments, master controller 302 (or another network device) transmits a request for the logged information to RF transceiver 306 and the request is responded to by wireless controller 370 by transmitting back the logged usage information. In a preferred embodiment a plurality of controllers such as control device 350 asynchronously collect usage information for their fixture and master controller 302, via request or via periodic transmission of the information by the controllers, gathers the usage information for later use.

Wireless controller 370 may also be configured to handle situations or events such as transmission failures, reception failures, and the like. Wireless controller 370 may respond to such failures by, for example, operating according to a retransmission scheme or another transmit failure mitigation scheme. Wireless controller 370 may also control any other modulating, demodulating, coding, decoding, routing, or other activities of RF transceiver 306. For example, control device 350's control logic (e.g., controlled by sensor logic module 374 and/or wireless controller 370) may periodically include making transmissions to other controllers in a zone, making transmissions to particular controllers, or otherwise. Such transmissions can be controlled by wireless controller 370 and such control may include, for example, maintaining a token-based transmission system, synchronizing clocks of the various RF transceivers or controllers, operating under a slot-based transmission/reception protocol, or otherwise.

Referring still to FIG. 3B, sensor 308 may be an infrared sensor, an optical sensor, a camera, a temperature sensor, a photodiode, a carbon dioxide sensor, or any other sensor configured to sense environmental conditions such as a lighting level or human occupancy of a space. For example, in one exemplary embodiment, sensor 308 is a motion sensor and sensor logic module 374 is configured to determine whether wireless controller 370 should change states (e.g., change the state of power relays 380) based on whether motion is detected by sensor 308 (e.g., detected motion reaches or exceeds threshold value). In the same or other embodiments, sensor logic module 374 may be configured to use the signal from the sensor 308 to determine an ambient lighting level. Sensor logic module 374 may then determine whether to change states based on the ambient lighting level. For example, sensor logic module 374 may use a condition such as time of day in addition to ambient lighting level to determine whether to turn the lighting fixture off or on. During a critical time of the day (e.g., while motion is present in the area, during a scheduled evening event, during morning hours near a school, etc.), even if the ambient lighting level is high, sensor logic module 374 may refrain from turning the lighting fixture off. In another embodiment, by way of further example, sensor logic module 374 is configured to provide a command to wireless controller 370 that is configured to cause wireless controller 370 to turn the one or more lamps of the fluorescent lighting fixture on when sensor logic module 374 detects motion via the signal from sensor 308 and when sensor logic module 374 determines that the ambient lighting level is below a threshold setpoint.

Referring yet further to FIG. 3B, wireless controller 370 is configured to prevent damage to lamps 340, 342 from manual or automatic control activities. Particularly, wireless controller 370 may be configured to prevent on/off cycling of lamps 340, 342 by holding the lamps in an "on" state for a predefined period of time (e.g., thirty minutes, fifteen minutes, etc.) even after the condition that caused the lamp to turn on is no longer true. Accordingly, if, for example, a low ambient lighting level causes circuit 310 to turn lamps 340, 342 on but then the ambient lighting level suddenly increases (the sun comes out), wireless controller 370 may keep the lamps on (even though the on condition expired) for a predetermined period of time so that the lamps are taken through their preferred cycle. Similarly, wireless controller 370 may be configured to hold the lamp in an "off" state for a predefined period of time since the lamp was last turned off to ensure that the lamp is given time to cool or otherwise settle after the last "on" state.

Referring yet further to FIG. 3B, sensor logic module 374 or wireless controller 370 may be configured to include a restrike violation module (e.g., in sensor memory 376) that is configured to prevent sensor logic module 374 from commanding circuit 310 to cause the fluorescent lamps to turn on while a restrike time is counted down. The restrike time may correspond with a maximum cool-down time for the lamp—allowing the lamp to experience its preferred strike-up cycle even if a command to turn the lamp back on is received at RF transceiver 306. In other embodiments, sensor logic module 374 or wireless controller 370 may be configured to prevent rapid on/off switching due to sensed motion, another environmental condition, or a sensor or controller error. Sensor logic module 374 or wireless controller 370 may be configured to, for example, entirely discontinue the on/off switching based on inputs received from the sensor by analyzing the behavior of the sensor, the switching, and logged usage information. By way of further example, sensor logic module 374 or wireless controller 370 may be configured to discontinue the on/off switching based on a determination that switching based on the inputs from the sensor has occurred too frequently (e.g., exceeding a threshold number of "on" switches within a predetermined amount of time, undesired switching based on the time of day or night, etc.). Sensor logic module 374 or wireless controller 370 may be configured to log or communicate such a determination. Using such configurations, sensor logic module 374 and/or wireless controller 370 are configured to self-diagnose and correct undesirable behavior that would otherwise continue occurring based on the default, user, or system-configured settings.

According to one embodiment, a self-diagnostic feature would monitor the number of times that a fixture or device was instructed to turn on (or off) based upon a signal received from a sensor (e.g. motion, ambient light level, etc.). If the number of instructions to turn on (or off) exceeded a predetermined limit during a predetermined time period, sensor logic module 374 and/or wireless controller 370 could be programmed to detect that the particular application for the fixture or device is not well-suited to control by such a sensor (e.g. not an optimum application for motion control or ambient light-based control, etc.), and would be programmed to disable such a motion or ambient light based control scheme, and report/log this action and the basis. For example, if the algorithm is based on more than X instructions to turn on (or off) in a 24 hour period, and the number of instructions provided based on signals from the sensor exceeds this limit within this period, the particular sensor-based control function would be disabled, as not being optimally suited to the application and a notification would be logged and provided to a user or facility manager. Of course, the limit and time period may be any suitable number and duration intended to suit the operational characteristics of the fixture/device and the application. In the event that a particular sensor-based control scheme in a particular zone is disabled by the logic module and/or control circuit, the fixture or device is intended to remain operational in response to other available control schemes (e.g. other sensors, time-based, user input or demand, etc.). The data logged by sensor logic module 374 and/or wireless controller 370 may also be used in a 'learning capacity' so that the controls may be more optimally tuned for the fixtures/devices in a particular application and/or zone. For example, sensor logic module 374 and/or wireless controller 370 may determine that disablement of a particular sensor-based control feature occurred due to an excessive number of instructions to turn on (or off) based on signals from a particular sensor that occurred within a particular time window, and may be reprogrammed to establish an alternate monitoring duration that excludes this particular time window for the particular sensor-based control scheme to 'avoid' time periods that are determined to be problematic. This ability to learn or self-update is intended to permit the system to adjust itself to update the sensor-based control schemes to different time periods that are more optimally suited for such a control scheme, and to avoid time periods that are less optimum for such a particular sensor-based control scheme.

Figure 4A:
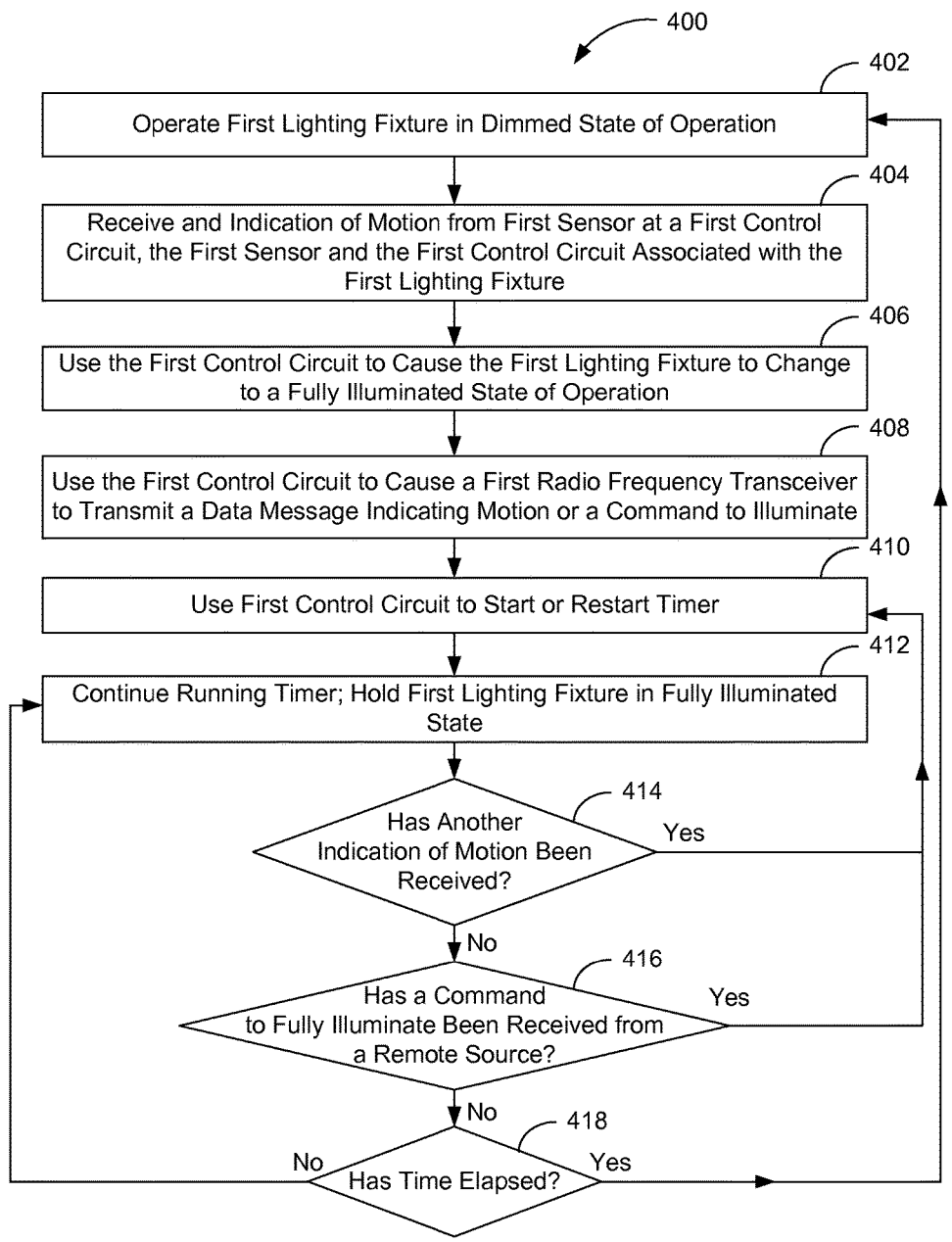
FIG. 4A is a flow chart of a process for illuminating a system of outdoor lighting fixtures, according to an exemplary embodiment.

Referring now to FIG. 4A, a flow chart of a process 400 for illuminating a system of outdoor lighting fixtures is shown, according to an exemplary embodiment. Process 400 includes operating a first lighting fixture in a dimmed state of operation (step 402). An indication of motion from a first sensor at a first control circuit is then received (step 404). The first sensor and the first control circuit are associated with the first lighting fixture. Using the first control circuit, the first lighting fixture is caused to change from a dimmed state of operation to a fully illuminated state of operation (step 406). A first radio frequency transceiver of the first control circuit is then used to transmit a data message indicating motion or a command to illuminate (step 408). The transmission is provided to other lighting fixtures (e.g., a subsequent lighting fixture in the same zone as the first lighting fixture).

Using the first control circuit, a timer is started (step 410). The timer may continue to run while the first lighting fixture is held in a fully illuminated state (step 412). Process 400 includes checking for whether another indication of motion has been received at the first control circuit (step 414). The indication of motion may be received from the first sensor according to an exemplary embodiment. If an indication of motion has been received, the first control circuit restarts the timer (step 410).

Process 400 includes checking for whether a command to fully illuminate has been received at a first control circuit from a remote source (step 416). The remote source may include another lighting fixture, according to an exemplary embodiment. If a command to fully illuminate has been received, the first control circuit restarts the timer (step 410). If no indication of motion or command from a remote source has been received, process 400 includes checking for whether time has elapsed (step 418). If the time has not elapsed, the timer continues to run (e.g., count up, count down, etc.) and the first lighting fixture remains in an illuminated state (step 412). If the time has elapsed, the first lighting fixture changes to a dimmed state of operation (step 402).

Figure 4B:
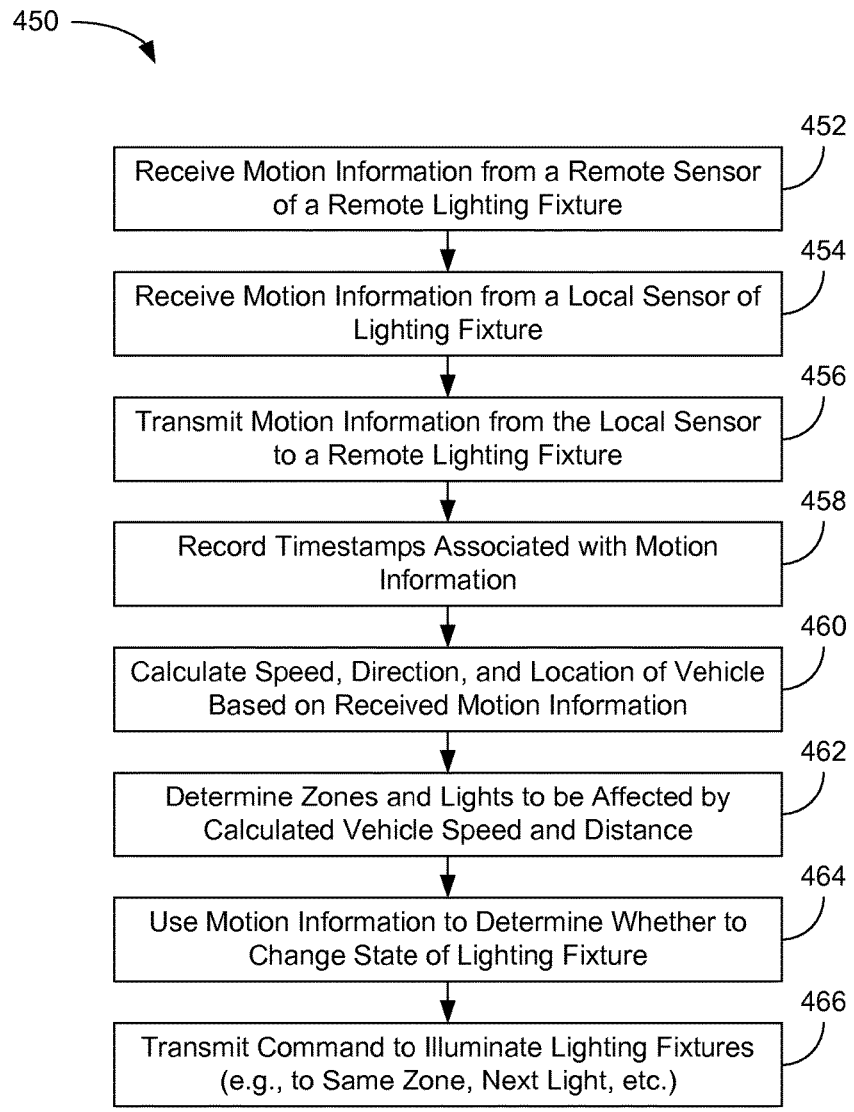
FIG. 4B is a flow chart of a process for using motion information to change states of a system of outdoor lighting fixtures, according to an exemplary embodiment.

Referring now to FIG. 4B, a flow chart of a process 450 for using motion information to change states of a system of outdoor lighting fixtures is shown, according to an exemplary embodiment. Process 450 includes receiving motion information from a remote sensor of a remote lighting fixture at a local lighting fixture (step 452). Motion information may include information about a moving object (e.g., a vehicle) such as the location of the vehicle when detected, a lighting fixture identifier, a zone identifier, or a lighting fixture location and a timestamp associated with the motion detection. Step 452 may further include receiving motion information about the same vehicle (or other moving object) from additional motion sensors coupled to additional lighting fixtures. Process 450 further includes receiving motion information from a local sensor of the lighting fixture (step 454). The motion information from the local sensor may be transmitted to a remote lighting fixture (step 456). According to one exemplary embodiment, process 450 may be executed at one lighting fixture and the results of process 450 may be transmitted to all other lighting fixtures. According to other exemplary embodiments, steps 452-456 may be executed at multiple lighting fixtures, allowing one or more other lighting fixtures to execute process 450 and to transmit the results to each other.

The timestamps associated with each set of motion information received may be recorded (step 458). A speed or direction of the detected vehicle is then calculated based on the motion information (step 460). Step 460 may include using the timestamps of the motion information along with location information of the sensors capturing the motion information to determine a speed at which the detected vehicle was traveling along with the direction in which the detected vehicle was traveling. Step 460 may further include estimating the current location of the vehicle.

The vehicle information (e.g., speed, direction, etc.) is used to determine which zones and lighting fixtures the vehicle may travel through next (step 462). The determination may be based on vehicle speed (e.g., the faster the vehicle is traveling, the more zones and lighting fixtures are affected as the vehicle will be approaching them quicker), vehicle direction (e.g., on a road with no turns, all zones or lighting fixtures under which the vehicle must travel before reaching a turn may be affected), and vehicle location (e.g., all zones or lighting fixtures within a specific distance of the current vehicle location may be determined to be affected by the vehicle motion). Process 450 further includes using the motion information to determine whether or not to change the state of the local lighting fixture (step 464). Process 450 further includes transmitting a command to illuminate (or to otherwise change states) to the affected zones and lighting fixtures (step 466). For example, affected zones and lighting fixtures may include the lighting fixture closest to the local lighting fixture, the next lighting fixture from the local lighting fixture, all lighting fixtures in the same zone as the local lighting fixture, the zones surrounding the local lighting fixture, or otherwise. For example, if a vehicle is estimated to travel through a zone, all lighting fixtures within the zone may receive a command to change to an "on" state. As another example, only specific lighting fixtures under which the vehicle is expected to travel under may receive a command to change to an "on" state. In some embodiments the lighting fixture will transmit "on" commands to lighting fixtures at a rate proportionate to the speed at which the vehicle is traveling. Accordingly, a greater number of lighting fixtures ahead of the vehicle may be commanded to be turned on for vehicles traveling at a great rate of speed relative to slower vehicles.

According to an exemplary embodiment, the change in states in steps 464, 466 may include changing from a fully illuminated state to a dimmed state, from a dimmed state to a fully illuminated state, from an off state to an illuminated or dimmed state, or otherwise. The changing of states may include configuring the lighting fixtures such that a "moving window" may be created (e.g., creating a succession of state changes such that lighting fixtures directly surrounding a vehicle are always fully illuminated while the next closest lighting fixtures are in a dimmed state) or configuring the lights in another manner (e.g., lights that are off may change to a dimmed state if the vehicle is approaching or if the vehicle just drove away from the area illuminated by the light, etc.).

According to an alternative exemplary embodiment, process 450 may be executed at a remote controller. The remote controller may receive motion information from all lighting fixtures and determine which lighting fixtures should change states. The remote controller may then transmit the command to the system of lighting fixtures.

Figure 5A:
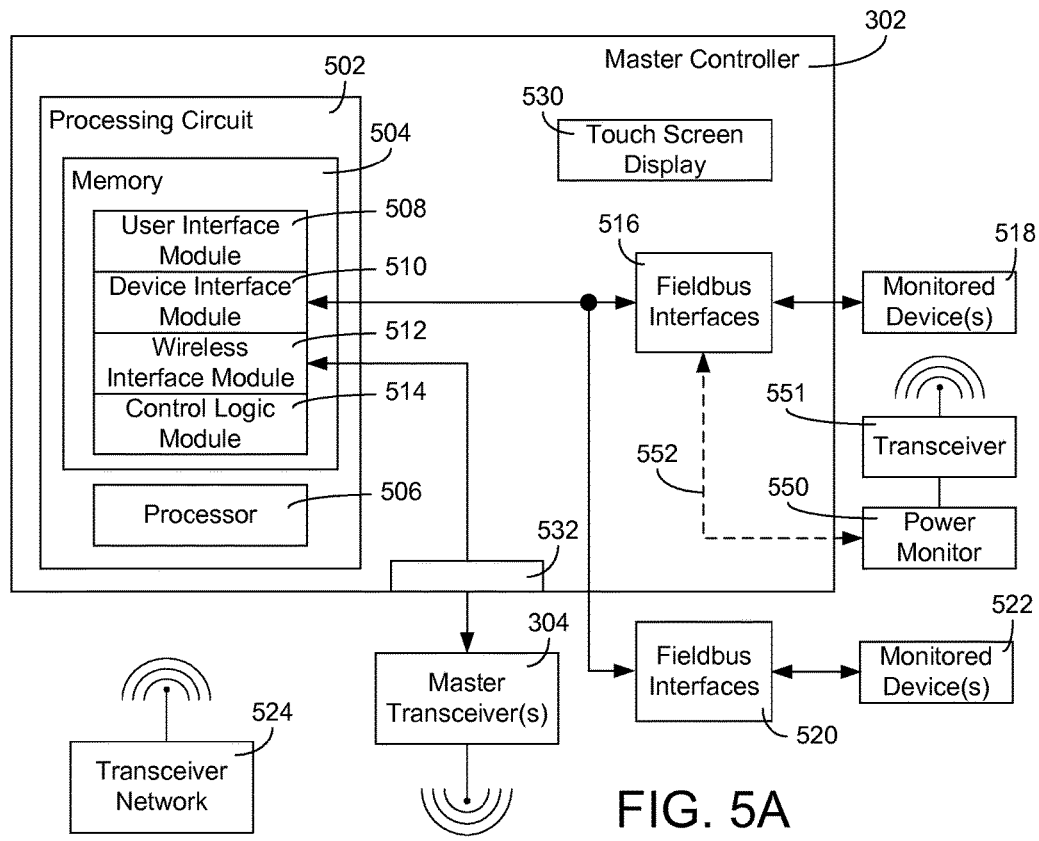
FIG. 5A is a more detailed block diagram of the master controller of FIG. 3A, according to an exemplary embodiment.

Referring now to FIG. 5A, a more detailed block diagram of master controller 302 (e.g., a control computer) is shown, according to an exemplary embodiment. Master controller 302 may be configured as the "master controller" described in U.S. application Ser. No. 12/240,805, filed Sep. 29, 2008, and incorporated herein by reference in its entirety. Master controller 302 is generally configured to receive user inputs (e.g., via touchscreen display 530) and to set or change settings of the lighting system based on the user inputs.

Referring further to FIG. 5A, master controller 302 is shown to include processing circuit 502 including memory 504 and processor 506. In an exemplary embodiment, master controller 302 and more particularly processing circuit 502 are configured to run a Microsoft Windows Operating System (e.g., XP, Vista, etc.) and are configured to include a software suite configured to provide the features described herein. The software suite may include a variety of modules (e.g., modules 508-514) configured to complete various activities of master controller 302. Modules 508-514 may be or include computer code, analog circuitry, one or more integrated circuits, or another collection of logic circuitry. In various exemplary embodiments, processor 506 may be a general purpose processor, a specific purpose processor, a programmable logic controller (PLC), a field programmable gate array, a combination thereof, or otherwise and configured to complete, cause the completion of, and/or facilitate the completion of the activities of master controller 302 described herein. Memory 504 may be configured to store historical data received from lighting fixture controllers or other devices, configuration information, schedule information, setting information, zone information, or other temporary or archived information. Memory 504 may also be configured to store computer code for execution by processor 506. When executed, such computer code (e.g., stored in memory 504 or otherwise, script code, object code, etc.) configures processing circuit 502, processor 506 or more generally master controller 302 for the activities described herein.

Touch screen display 530 and more particularly user interface module 508 are configured to allow and facilitate user interaction (e.g., input and output) with master controller 302. It should be appreciated that in alternative embodiments of master controller 302, the display associated with master controller 302 may not be a touch screen, may be separated from the casing housing master controller 302, and/or may be distributed from master controller 302 and connected via a network connection (e.g., Internet connection, LAN connection, WAN connection, etc.). Further, it should be appreciated that master controller 302 may be connected to a mouse, keyboard, or any other input device or devices for providing user input to master controller 302.

Master controller 302 is shown to include a communications interface 532 configured to connect to a wire associated with master transceiver 304.

Communications interface 532 may be a proprietary circuit for communicating with master transceiver 304 via a proprietary communications protocol. In other embodiments, communications interface 532 may be configured to communicate with master transceiver 304 via a standard communications protocol. For example, communications interface 532 may include Ethernet communications electronics (e.g., an Ethernet card) and an appropriate port (e.g., an RJ45 port configured for CAT5 cabling) to which an Ethernet cable is run from master controller 302 to master transceiver 304. Master transceiver 304 may be as described in U.S. application Ser. Nos. 12/240,805, 12/057,217, or 11/771,317 which are each incorporated herein by reference. Communications interface 532 and more generally master transceiver 304 are controlled by logic of wireless interface module 512. Wireless interface module 512 may include drivers, control software, configuration software, or other logic configured to facilitate communications activities of master controller 302 with lighting fixture controllers. For example, wireless interface module 512 may package, address format, or otherwise prepare messages for transmission to and reception by particular controllers or zones. Wireless interface module 512 may also interpret, route, decode, or otherwise handle communications received at master transceiver 304 and communications interface 532.

Referring still to FIG. 5A, user interface module 508 may include the software and other resources for the display and the handling of automatic or user inputs received at the graphical user interfaces of master controller 302. While user interface module 508 is executing and receiving user input, user interface module 508 may interpret user input and cause various other modules, algorithms, routines, or sub-processes to be called, initiated, or otherwise affected. For example, control logic module 514 and/or a plurality of control sub-processes thereof may be called by user interface module 508 upon receiving certain user input events. User interface module 508 may also be configured to include server software (e.g., web server software, remote desktop software, etc.) configured to allow remote access to the display. User interface module 508 may be configured to complete some of the control activities described herein rather than control logic module 514. In other embodiments, user interface module 508 merely drives the graphical user interfaces and handles user input/output events while control logic module 514 controls the majority of the actual control logic.

Control logic module 514 may be the primary logic module for master controller 302 and may be the main routine that calls, for example, modules 508, 510, etc. Control logic module 514 may generally be configured to provide lighting control, energy savings calculations, demand/response-based control, load shedding, load submetering, HVAC control, building automation control, workstation control, advertisement control, power strip control, "sleep mode" control, or any other types of control. In an exemplary embodiment, control logic module 514 operates based off of information stored in one or more databases of master controller 302 and stored in memory 504 or another memory device in communication with master controller 302. The database may be populated with information based on user input received at graphical user interfaces and control logic module 514 may continuously draw on the database information to make control decisions. For example, a user may establish any number of zones, set schedules for each zone, create ambient lighting parameters for each zone or fixture, etc. This information is stored in the database, related (e.g., via a relational database scheme, XML sets for zones or fixtures, or otherwise) and recalled by control logic module 514 as control logic module 514 proceeds through its various control algorithms.

Control logic module 514 may include any number of functions or sub-processes. For example, a scheduling sub-process of control logic module 514 may check at regular intervals to determine if an event is scheduled to take place. When events are determined to take place, the scheduling sub-process or another routine of control logic module 514 may call or otherwise use another module or routine to initiate the event. For example, if the schedule indicates that a zone should be turned off at 5:00 pm, then when 5:00 pm arrives the scheduling sub-process may call a routine (e.g., of wireless interface module) that causes an "off" signal to be transmitted by master transceiver 304. Control logic module 514 may also be configured to conduct or facilitate the completion of any other process, sub-process, or process steps conducted by master controller 302 described herein. For example, control logic module 514 may be configured to use motion information received from remote sensors and determine a state for the lighting fixture and other lighting fixtures.

Referring further to FIG. 5A, device interface module 510 facilitates the connection of one or more field devices, sensors, or other inputs not associated with master transceiver 304. For example, fieldbus interfaces 516, 520 may be configured to communicate with any number of monitored devices 518, 522. The communication may be according to a communications protocol which may be standard or proprietary and/or serial or parallel. Fieldbus interfaces 516, 520 can be or include circuit cards for connection to processing circuit 502, jacks or terminals for physically receiving connectors from wires coupling monitored devices 518, 522, logic circuitry or software for translating communications between processing circuit 502 and monitored devices 518, 522, or otherwise. In an exemplary embodiment, device interface module 510 handles and interprets data input from the monitored devices and controls the output activities of fieldbus interfaces 516, 520 to monitored devices 518, 522.

Fieldbus interfaces 516, 520 and device interface module 510 may also be used in concert with user interface module 508 and control logic module 514 to provide control to the monitored devices 518, 522. For example, monitored devices 518, 522 may be mechanical devices configured to operate a motor, one or more electronic valves, one or more workstations, machinery stations, a solenoid or valve, or otherwise. Such devices may be assigned to zones similar to the lighting fixtures described above and below or controlled independently. User interface module 508 may allow schedules and conditions to be established for each of devices 518, 522 so that master controller 302 may be used as a comprehensive energy management system for a facility. For example, a motor that controls the movement of a spinning advertisement may be coupled to the power output or relays of a controller very similar if not identical to master controller 302. This controller may be assigned to a zone (e.g., via user interfaces at touchscreen display 530) and provided a schedule for turning on and off during the day. In another embodiment, the electrical relays of the controller may be coupled to other devices such as video monitors for informational display, exterior signs, task lighting, audio systems, or other electrically operated devices.

Referring further to FIG. 5A, power monitor 550 is shown as coupled to fieldbus interfaces 516 in an exemplary embodiment. However, power monitor 550 may also or alternatively be coupled to its own controller or RF transceiver 551 for communicating with master transceiver 304. Power monitor 550 may generally be configured to couple to power resources (e.g., facility outputs, power company transformers, building mains input, building power meter, etc.) and to receive or calculate an indication of power utilized by a facility or lighting system. This input may be received in a variety of different ways according to varying embodiments. For example, power monitor 550 may include a current transformer (CT) configured to measure the current in the mains inlet to a lighting system or facility, may be coupled to or include a pulse monitor, may be configured to monitor voltage, or may monitor power in other ways. Power monitor 550 is intended to provide "real time" or "near real time" monitoring of power and to provide the result of such monitoring to master controller 302 for use or reporting. When used with power monitor 550, control logic module 514 may be configured to include logic that sheds loads (e.g., sends off signals to lighting fixtures via a lighting fixture controller network, sends off signals to monitored devices 518, 522, adjusts ambient light setpoints, adjusts schedules, shuts lights off according to a priority tier, etc.) to maintain a setpoint power meter level or threshold. In other exemplary embodiments, control logic module 514 may store or receive pricing information from a utility and shed loads if the metered power usage multiplied by the pricing rate is greater than certain absolute thresholds or tiered thresholds. For example, if daily energy cost is expected to exceed $500 for a facility or lighting system, control logic module 506 may be configured to change the ambient light setpoints for the lighting fixtures in the system until daily energy cost is expected to fall beneath $500. In an exemplary embodiment, user interface module 508 is configured to cause a screen to be displayed that allows a user to associate different zones or lighting fixtures with different demand/response priority levels. Accordingly, a utility provider or internal calculation determines that a load should be shed, control logic module 514 will check the zone or lighting fixture database to shed loads of the lowest priority first while leaving higher priority loads unaffected.

Figure 5B:
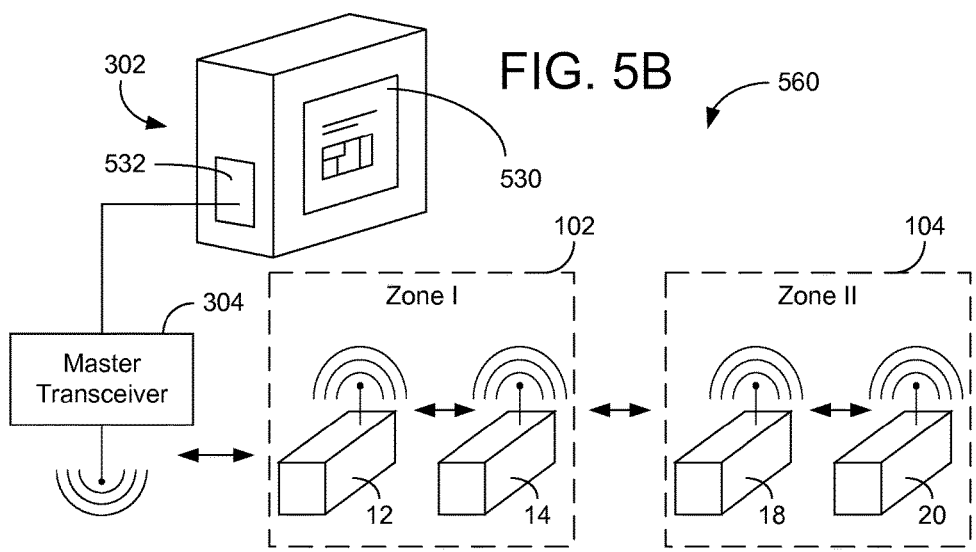
FIG. 5B is a diagram of a facility lighting system for use with the systems and methods of the present disclosure, according to an exemplary embodiment.

Referring now to FIG. 5B, a diagram of a facility lighting system 560 for use with the lighting fixture system including controller 302 is shown, according to an exemplary embodiment. Master controller 302 (e.g., a control computer) is preferably configured to provide a graphical user interface to a local or remote electronic display screen for allowing a user to adjust control parameters, turn lighting fixtures on or off, or to otherwise affect the operation of lighting fixtures in a facility. For example, master controller 302 is further shown to include touch screen display 530 for displaying such a graphical user interface and for allowing user interaction (e.g., input and output) with master controller 302. Various exemplary graphical user interfaces for display on touch screen display 530 and control activities associated therewith are described in subsequent paragraphs and with reference to subsequent Figures of the present disclosure. It should be noted that while master controller 302 is shown in FIG. 5B as housed in a wall-mounted panel it may be housed in or coupled to any other suitable computer casing or frame. The user interfaces are intended to provide an easily configurable lighting and/or energy management system for a facility. The user interfaces are intended to allow even untrained users to reconfigure or reset a lighting system using relatively few clicks. In an exemplary embodiment, the user interfaces do not require a keyboard for entering values. Advantageously, users other than engineers or facility managers may be able to setup, interact with, or reconfigure the system using the provided user interfaces.

Referring further to FIG. 5B, master controller 302 is shown connected to master transceiver 304. Master transceiver 304 may be a radio frequency transceiver configured to provide wireless signals to a network of controllers such as master controller 302. In FIG. 5B, master transceiver 304 is shown in bi-directional wireless communication with a plurality of lighting fixtures 12, 14, 18, 20. FIG. 5B further illustrates fixtures 12, 14 forming a first logical group 102 identified as "Zone I" and fixtures 18, 20 forming a second logical group 104 identified as "Zone II" (e.g., the zones 102, 104 as shown in FIG. 2).

Master controller 302 may be configured to provide commands for zones 102, 104 and their associated lighting fixtures. For example, also referring to FIG. 4B, master controller 302 may receive motion information from the sensors of lighting fixtures 12, 14, 18, 20 and provide commands for lighting fixtures 12, 14, 18, 20 to master transceiver 304 for transmitting to the appropriate zones and lighting fixtures. Master controller 302 may be configured to provide different processing or different commands for zone 102 relative to zone 104. For example, a command to change a lighting fixture status may be transmitted to only zone 102 if master controller 302 determines only zone 102 is affected by a current condition (e.g., a detected vehicle, etc.) While master controller 302 is configured to complete a variety of control activities for lighting fixtures 12, 14, 18, 20, in many exemplary embodiments of the present disclosure, each controller associated with a lighting fixture (e.g., lighting fixtures 12, 14, 18, 20) includes circuitry configured to provide a variety of "smart" or "intelligent features" that are either independent of master controller 302 or operate in concert with master controller 302.

According to various exemplary embodiments, the systems and methods of the present disclosure may be used in a street lighting system. According to other exemplary embodiments, the systems and methods of the present disclosure may be used in warehouses, parking lots, garages, or otherwise. For example, the lighting system can be used in a gas station (e.g., when a vehicle approaches a pump, pump lights or canopy lights can turn on or change to a brightened state, a camera may be caused to activate, and a control circuit within the pump may be communicated with to trigger the playback of advertisements via a pump display and/or via a pump audio system, etc.).

While many of the embodiments described herein utilize active communication (e.g., RF commands, RF information messages, etc.) to effect the serial illumination of a plurality of outdoor lighting fixtures, in other embodiments the lighting fixtures of an outdoor lighting system only utilize local sensor information (e.g., motion sensor, light sensor, infrared sensor, etc.) to determine whether to illuminate. In such embodiments, a radio frequency transceiver or other electronics for fixture-to-fixture communications may not be provided. In yet other embodiments, the radio frequency transceiver or other electronics for fixture-to-fixture communications are provided but are not utilized by circuitry of the outdoor lighting system for responding to environmental states (e.g., motion, presence of a vehicle, etc.).

In an embodiment where the lighting fixtures do not utilize active communication (e.g., RF commands, RF information messages, etc.) to effect the serial illumination of a plurality of outdoor lighting fixtures, each outdoor lighting fixture includes a control circuit and an environment sensor. The control circuit only illuminates the outdoor lighting fixture in response to manual triggering, a pre-established schedule, a command signal from a supervisory controller, or a sensor signal (e.g., that there is motion detected nearby).

The control circuit operates the lighting fixture without recognizing any fixture-to-fixture communications.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure. For example, the lighting fixtures described herein may be used with varying bulb technologies (e.g., high intensity discharge (HID), high intensity fluorescent (HIF), LED, etc.) according to varying exemplary or alternative embodiments.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A lighting fixture, comprising:
    a first light and a second light;
    a motion sensor;
    a radio frequency transceiver; and
    a circuit coupled to the first light, the second light, the motion sensor, and the radio frequency transceiver;
    wherein the circuit is configured to cause the first light to be in an activated state of operation such that the first light is illuminating and the second light to be in a deactivated state of operation such that the second light is not illuminated;
    wherein the circuit is further configured to receive a signal from the motion sensor and to determine whether the signal is representative of motion;
    wherein the circuit is further configured to respond to a determination that the signal is representative of motion by causing the second light to enter an activated state of operation such that the second light is illuminated;
    wherein the circuit is further configured to cause the radio frequency transceiver to transmit at least one of a message indicating motion and an illuminate command for receipt by other lighting fixtures.

2. The lighting fixture of claim 1, wherein the lighting fixture is further configured to respond to a transmission received from other lighting fixtures at the radio frequency transceiver, and to activate the second light if the transmission is a message indicating motion or an illuminate command.

3. The lighting fixture of claim 2, wherein the lighting fixture is further configured to retransmit, via the radio frequency transceiver, the received transmission as an indication of motion or an illuminate command in response to receiving the transmission.

4. The lighting fixture of claim 3, wherein the circuit is configured to deactivate the second light after a period of time wherein no new radio frequency transmissions are received and no new motion is detected via the motion sensor, and wherein the circuit is configured to hold the first lighting fixture in an activated state despite the deactivation of the second light.

5. The lighting fixture of claim 4, wherein the circuit is configured to cause status information to be transmitted, via the radio frequency transceiver, to nearby lighting fixtures for retransmission to a main controller.

6. The lighting fixture of claim 5, wherein the circuit is configured to only react to received radio frequency transmissions if received from a lighting fixture of its zone or an adjacent zone.

7. The lighting fixture of claim 6, wherein the lighting fixture is a streetlight.

8. The lighting fixture of claim 7, wherein the motion sensor and the circuit are configured to ascertain a direction of movement in addition to the binary presence or absence of motion, and to adjust at least one lighting event in response to the ascertained direction of movement.

9. The lighting fixture of claim 8, wherein the motion sensor and the circuit are configured to ascertain a speed of movement in addition to the binary presence or absence of motion, and to adjust the at least one lighting event in response to the ascertained speed of the movement.

10. The lighting fixture of claim 9, wherein the first light is a high intensity discharge fluorescent lamp.

11. The lighting fixture of claim 9, wherein the second light is a high intensity discharge fluorescent lamp.

12. The lighting fixture of claim 9, wherein the first lamp and the second lamp are LED arrays.

* * * * *